(12) United States Patent
Huizen et al.

(10) Patent No.: US 11,597,322 B2
(45) Date of Patent: Mar. 7, 2023

(54) VEHICULAR EXTERIOR MIRROR SYSTEM WITH LIGHT MODULE

(71) Applicant: Magna Mirrors of America, Inc., Holland, MI (US)

(72) Inventors: Gregory A. Huizen, Hudsonville, MI (US); Keith D. Foote, Caledonia, MI (US)

(73) Assignee: MAGNA MIRRORS OF AMERICA, INC., Holland, MI (US)

( * ) Notice: Subject to any disclaimer, the term of this patent is extended or adjusted under 35 U.S.C. 154(b) by 0 days.

(21) Appl. No.: 17/305,255

(22) Filed: Jul. 2, 2021

(65) Prior Publication Data

US 2021/0323479 A1  Oct. 21, 2021

Related U.S. Application Data

(63) Continuation of application No. 16/946,766, filed on Jul. 6, 2020, now Pat. No. 11,052,826, which is a
(Continued)

(51) Int. Cl.
*F21S 43/14* (2018.01)
*B60R 1/12* (2006.01)
(Continued)

(52) U.S. Cl.
CPC .......... *B60R 1/1207* (2013.01); *B60Q 1/2665* (2013.01); *B60R 1/12* (2013.01);
(Continued)

(58) Field of Classification Search
CPC ........ B60Q 1/2665; B60Q 1/381; B60R 1/12; B60R 1/1207; B60R 2001/1253;
(Continued)

(56) References Cited

U.S. PATENT DOCUMENTS

| 4,041,301 A | 8/1977 | Pelchat |
| 4,788,630 A | 11/1988 | Gavagan |

(Continued)

FOREIGN PATENT DOCUMENTS

| DE | 10212794 A1 | 6/2003 |
| EP | 1284335 A1 | 2/2003 |

(Continued)

*Primary Examiner* — Zheng Song
(74) *Attorney, Agent, or Firm* — Honigman LLP

(57) ABSTRACT

A vehicular lighted exterior rearview mirror system includes a lighted exterior rearview mirror assembly and a light module disposed thereat. The light module includes at least three forward illuminating illumination sources that, with the lighted exterior rearview mirror assembly attached at the side of the vehicle, are arranged spaced apart at the lighted exterior rearview mirror assembly. With the lighted exterior rearview mirror assembly attached at the side of the equipped vehicle, the at least three forward illuminating illumination sources, when powered, emit light at least in a forward direction with respect to the vehicle. The light module includes a turn signal indicating illumination source and a light piping element. The light piping element guides light emitted by the turn signal indicating illumination source along the light piping element so as to emanate from the light module at an outboard portion of the mirror casing.

25 Claims, 10 Drawing Sheets

Related U.S. Application Data continuation of application No. 16/806,089, filed on Mar. 2, 2020, now Pat. No. 10,703,285, which is a continuation of application No. 13/891,619, filed on May 10, 2013, now Pat. No. 10,576,896, which is a continuation-in-part of application No. 13/249,433, filed on Sep. 30, 2011, now Pat. No. 8,764,256.

(60) Provisional application No. 61/645,959, filed on May 11, 2012, provisional application No. 61/388,747, filed on Oct. 1, 2010.

(51) Int. Cl.

| | | |
|---|---|---|
| *B60Q 1/26* | (2006.01) | |
| *F21S 43/245* | (2018.01) | |
| *F21S 43/19* | (2018.01) | |
| *F21S 43/243* | (2018.01) | |
| *F21S 43/237* | (2018.01) | |
| *F21S 43/249* | (2018.01) | |
| *F21S 45/48* | (2018.01) | |
| *F21S 45/47* | (2018.01) | |

(52) U.S. Cl.
CPC ............... *F21S 43/14* (2018.01); *F21S 43/19* (2018.01); *F21S 43/237* (2018.01); *F21S 43/243* (2018.01); *F21S 43/245* (2018.01); *F21S 43/249* (2018.01); *B60R 2001/1253* (2013.01); *F21S 45/47* (2018.01); *F21S 45/48* (2018.01)

(58) Field of Classification Search
CPC .......... F21S 43/14; F21S 43/19; F21S 43/237; F21S 43/243; F21S 43/245; F21S 43/249; F21S 45/47; F21S 45/48
See application file for complete search history.

(56) References Cited

U.S. PATENT DOCUMENTS

| | | | |
|---|---|---|---|
| 4,972,173 A | 11/1990 | Raciti | |
| 5,040,103 A | 8/1991 | Lyons | |
| 5,233,375 A | 8/1993 | Williams et al. | |
| 5,297,010 A | 3/1994 | Camarota et al. | |
| 5,371,659 A | 12/1994 | Pastrick et al. | |
| 5,497,305 A | 3/1996 | Pastrick et al. | |
| 5,497,306 A | 3/1996 | Pastrick | |
| 5,499,169 A | 3/1996 | Chen | |
| 5,581,230 A | 12/1996 | Barrett | |
| 5,669,699 A | 9/1997 | Pastrick et al. | |
| 5,671,996 A | 9/1997 | Bos et al. | |
| 5,786,772 A | 7/1998 | Schofield et al. | |
| 5,815,018 A | 9/1998 | Soborski | |
| 5,823,654 A | 10/1998 | Pastrick et al. | |
| 5,929,786 A | 7/1999 | Schofield et al. | |
| 5,938,321 A | 8/1999 | Bos et al. | |
| 6,002,341 A | 12/1999 | Ohta et al. | |
| 6,049,271 A | 4/2000 | Chu | |
| 6,062,613 A | 5/2000 | Jung et al. | |
| 6,070,998 A | 6/2000 | Jennings et al. | |
| 6,086,229 A | 7/2000 | Pastrick | |
| 6,139,172 A | 10/2000 | Bos et al. | |
| 6,149,287 A | 11/2000 | Pastrick et al. | |
| 6,152,590 A | 11/2000 | Furst et al. | |
| 6,158,869 A | 12/2000 | Barnes, Jr. | |
| 6,164,805 A | 12/2000 | Hulse | |
| 6,168,302 B1 | 1/2001 | Hulse | |
| 6,174,016 B1 | 1/2001 | Ponziani | |
| 6,176,602 B1 | 1/2001 | Pastrick et al. | |
| 6,186,650 B1 | 2/2001 | Hulse et al. | |
| 6,193,399 B1 | 2/2001 | Hulse | |
| 6,198,409 B1 | 3/2001 | Schofield et al. | |
| 6,217,201 B1 | 4/2001 | Hulse | |
| 6,227,689 B1 | 5/2001 | Miller | |
| 6,238,074 B1 | 5/2001 | Hulse et al. | |
| 6,244,734 B1 | 6/2001 | Hulse | |
| 6,247,343 B1 | 6/2001 | Weiss et al. | |
| 6,250,784 B1 | 6/2001 | Kayama | |
| 6,260,991 B1 | 7/2001 | Hulse | |
| 6,273,579 B1 | 8/2001 | Holloway | |
| 6,276,821 B1 | 8/2001 | Pastrick et al. | |
| 6,280,069 B1 | 8/2001 | Pastrick et al. | |
| 6,291,905 B1 | 9/2001 | Drummond et al. | |
| 6,299,333 B1 | 10/2001 | Pastrick et al. | |
| 6,304,168 B1 | 10/2001 | Ohta et al. | |
| 6,315,419 B1 | 11/2001 | Platzer, Jr. | |
| 6,347,880 B1 | 2/2002 | Furst et al. | |
| 6,349,450 B1 | 2/2002 | Koops et al. | |
| 6,390,529 B1 | 5/2002 | Bingle et al. | |
| 6,396,408 B2 | 5/2002 | Drummond et al. | |
| 6,416,208 B2 | 7/2002 | Pastrick et al. | |
| 6,416,209 B1 | 7/2002 | Abbott | |
| 6,477,464 B2 | 11/2002 | McCarthy et al. | |
| 6,522,451 B1 | 2/2003 | Lynam | |
| 6,523,888 B1 | 2/2003 | Yan et al. | |
| 6,550,103 B2 | 4/2003 | Koops et al. | |
| 6,561,667 B2 | 5/2003 | Stapf | |
| 6,561,685 B2 | 5/2003 | Weber et al. | |
| 6,568,839 B1 | 5/2003 | Pastrick et al. | |
| 6,577,228 B1 | 6/2003 | Tsuchida et al. | |
| 6,582,109 B2 | 6/2003 | Miller | |
| 6,616,313 B2 | 9/2003 | Furst et al. | |
| 6,623,124 B2 | 9/2003 | Okura | |
| 6,669,267 B1 | 12/2003 | Lynam et al. | |
| 6,690,268 B2 | 2/2004 | Schofield et al. | |
| 6,710,471 B1 | 3/2004 | Schmitz | |
| 6,717,712 B2 | 4/2004 | Lynam et al. | |
| 6,779,372 B2 | 8/2004 | Arlt et al. | |
| 6,793,385 B2 | 9/2004 | Tiesler et al. | |
| 6,809,630 B1 | 10/2004 | Dreimann et al. | |
| 6,812,823 B2 | 11/2004 | Inaba et al. | |
| 6,824,281 B2 | 11/2004 | Schofield et al. | |
| 6,847,289 B2 | 1/2005 | Pang et al. | |
| 6,848,816 B2 | 2/2005 | Gilbert et al. | |
| 6,848,818 B2 | 2/2005 | Huizenga | |
| 6,854,870 B2 | 2/2005 | Huizenga | |
| 6,871,887 B2 | 3/2005 | Jooss et al. | |
| 6,907,643 B2 | 6/2005 | Koops et al. | |
| 6,924,735 B2 | 8/2005 | Ueda et al. | |
| 6,926,431 B1 | 8/2005 | Foote et al. | |
| 6,926,432 B2 | 8/2005 | Rodriguez Barros et al. | |
| 6,932,497 B1 | 8/2005 | Huang | |
| 6,969,101 B2 | 11/2005 | Lynam et al. | |
| 6,977,619 B2 | 12/2005 | March et al. | |
| 6,981,789 B2 | 1/2006 | Assinder et al. | |
| 7,005,959 B2 | 2/2006 | Amagasa et al. | |
| 7,049,940 B2 | 5/2006 | Ieda et al. | |
| 7,055,997 B2 | 6/2006 | Baek | |
| 7,065,439 B2 | 6/2006 | Sakakura | |
| 7,091,836 B2 | 8/2006 | Kachouh et al. | |
| 7,097,312 B2 | 8/2006 | Platzer, Jr. | |
| 7,104,675 B2 | 9/2006 | Chen | |
| 7,121,688 B2 | 10/2006 | Rempel | |
| 7,126,456 B2 | 10/2006 | Boddy et al. | |
| 7,175,321 B1 | 2/2007 | Lopez | |
| 7,175,324 B2 | 2/2007 | Kwon | |
| 7,188,963 B2 | 3/2007 | Schofield et al. | |
| 7,188,981 B2 | 3/2007 | Rodriguez Barros et al. | |
| 7,192,171 B2 | 3/2007 | Rodriguez Barros et al. | |
| 7,195,381 B2 | 3/2007 | Lynam et al. | |
| 7,199,317 B2 | 4/2007 | Ieda et al. | |
| 7,210,715 B2 | 5/2007 | Kobayashi et al. | |
| 7,210,798 B2 | 5/2007 | Belliveau et al. | |
| 7,244,054 B2 | 7/2007 | Chou | |
| 7,255,451 B2 | 8/2007 | McCabe et al. | |
| 7,255,464 B2 | 8/2007 | Rodriguez Barros et al. | |
| 7,258,471 B2 | 8/2007 | Rodriguez Barros et al. | |
| 7,261,446 B2 | 8/2007 | Thomas | |
| 7,270,452 B2 | 9/2007 | Wang | |
| 7,274,501 B2 | 9/2007 | McCabe et al. | |
| 7,289,037 B2 | 10/2007 | Uken et al. | |
| 7,333,021 B2 | 2/2008 | Ieda et al. | |
| 7,334,923 B2 | 2/2008 | Tanaka et al. | |

(56) References Cited

U.S. PATENT DOCUMENTS

| | | |
|---|---|---|
| 7,344,284 B2 | 3/2008 | Lynam et al. |
| 7,350,949 B2 | 4/2008 | Meinke et al. |
| 7,407,203 B2 | 8/2008 | Huizenga et al. |
| 7,438,453 B2 | 10/2008 | Saitoh et al. |
| 7,492,281 B2 | 2/2009 | Lynam et al. |
| 7,513,664 B2 | 4/2009 | Chou |
| 7,524,092 B2 | 4/2009 | Rodriguez Barros et al. |
| 7,581,859 B2 | 9/2009 | Lynam |
| 7,594,742 B2 | 9/2009 | Apfelbeck et al. |
| 7,607,809 B2 | 10/2009 | Misawa |
| 7,626,749 B2 | 12/2009 | Baur et al. |
| 7,635,210 B2 | 12/2009 | Metros et al. |
| 7,708,438 B2 | 5/2010 | Yajima et al. |
| 7,748,856 B2 | 7/2010 | Zhao |
| 7,878,693 B2 | 2/2011 | Liesener |
| 7,944,371 B2 | 5/2011 | Foote et al. |
| 7,988,305 B2 | 8/2011 | Itoh et al. |
| 8,058,977 B2 | 11/2011 | Lynam |
| 8,274,226 B1 | 9/2012 | Sikora et al. |
| 8,287,164 B2 | 10/2012 | Fehn et al. |
| 8,333,492 B2 | 12/2012 | Dingman et al. |
| 10,576,896 B2 | 3/2020 | Huizen et al. |
| 10,703,285 B1 | 7/2020 | Huizen et al. |
| 11,052,826 B2 | 7/2021 | Huizen et al. |
| 2002/0036908 A1 | 3/2002 | Pederson |
| 2002/0105432 A1 | 8/2002 | Pederson et al. |
| 2003/0169160 A1 | 9/2003 | Rodriguez Barros et al. |
| 2003/0174499 A1 | 9/2003 | Bohlander |
| 2004/0190303 A1* | 9/2004 | Mishimagi ............ B60Q 1/2665 362/494 |
| 2004/0233677 A1 | 11/2004 | Su et al. |
| 2005/0036329 A1 | 2/2005 | Henschel et al. |
| 2005/0105299 A1 | 5/2005 | Gilbert et al. |
| 2005/0117364 A1 | 6/2005 | Rennick et al. |
| 2005/0243172 A1 | 11/2005 | Takano et al. |
| 2006/0038418 A1 | 2/2006 | Huizenga et al. |
| 2006/0061008 A1 | 3/2006 | Kamer et al. |
| 2006/0133103 A1 | 6/2006 | Muhlbaier et al. |
| 2006/0226953 A1 | 10/2006 | Shelley et al. |
| 2007/0040665 A1 | 2/2007 | Scott |
| 2007/0097698 A1 | 5/2007 | Song et al. |
| 2007/0182527 A1 | 8/2007 | Traylor et al. |
| 2007/0203618 A1 | 8/2007 | McBride et al. |
| 2007/0206383 A1 | 9/2007 | Broude et al. |
| 2008/0018127 A1 | 1/2008 | Schindler et al. |
| 2008/0061933 A1 | 3/2008 | Ieda et al. |
| 2009/0040306 A1 | 2/2009 | Foote et al. |
| 2009/0073709 A1 | 3/2009 | Yajima et al. |
| 2009/0115631 A1* | 5/2009 | Foote .................... B60R 1/0602 340/901 |
| 2009/0161379 A1 | 6/2009 | Liesener |
| 2009/0257240 A1 | 10/2009 | Koike |
| 2010/0321945 A1 | 12/2010 | Lang et al. |
| 2010/0321946 A1 | 12/2010 | Dingman et al. |
| 2011/0001428 A1* | 1/2011 | Rodriguez ........... B60Q 1/2665 362/519 |
| 2012/0020099 A1* | 1/2012 | Bingle ................. B60R 1/1207 362/464 |
| 2012/0020100 A1* | 1/2012 | Bingle .................... B60R 1/06 362/494 |
| 2012/0062743 A1 | 3/2012 | Lynam et al. |
| 2012/0081915 A1 | 4/2012 | Foote et al. |
| 2012/0162427 A1 | 6/2012 | Lynam |
| 2013/0130674 A1 | 5/2013 | De Wind et al. |

FOREIGN PATENT DOCUMENTS

| | | |
|---|---|---|
| EP | 1304260 A1 | 4/2003 |
| EP | 1690736 A2 | 8/2006 |
| EP | 1738959 A2 | 1/2007 |
| GB | 2341365 A | 3/2000 |
| GB | 2342212 A | 4/2000 |
| WO | 2005035308 A1 | 4/2005 |
| WO | 2008051910 A2 | 5/2008 |
| WO | 2011028686 A1 | 3/2011 |

* cited by examiner

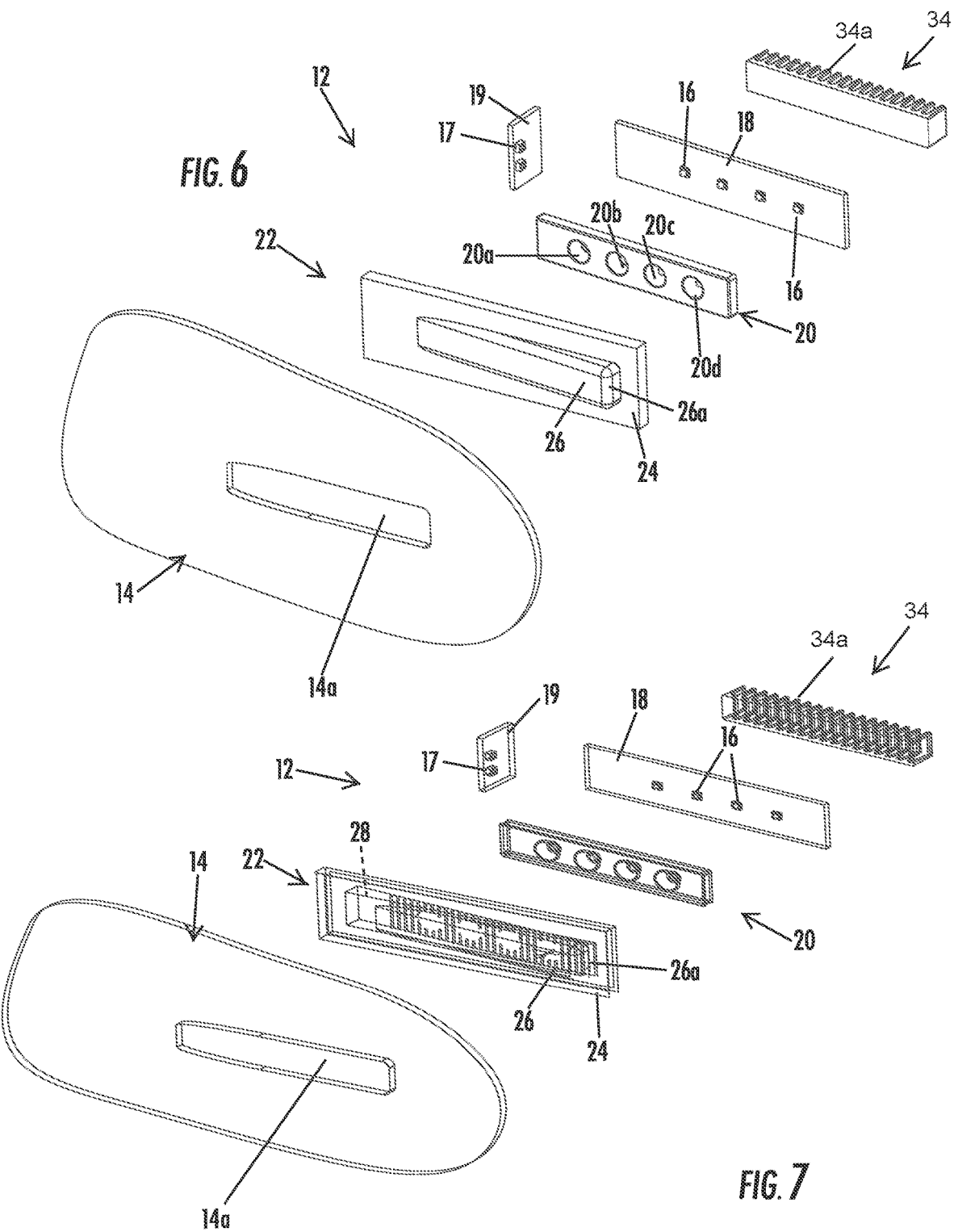

VEHICULAR EXTERIOR MIRROR SYSTEM WITH LIGHT MODULE

CROSS REFERENCE TO RELATED APPLICATIONS

The present application is a continuation of U.S. patent application Ser. No. 16/946,766, filed Jul. 6, 2020, now U.S. Pat. No. 11,052,826, which is a continuation of U.S. patent application Ser. No. 16/806,089, filed Mar. 2, 2020, now U.S. Pat. No. 10,703,285, which is a continuation of U.S. patent application Ser. No. 13/891,619, filed May 10, 2013, now U.S. Pat. No. 10,576,896, which claims the filing benefit of U.S. provisional application, Ser. No. 61/645,959, filed May 11, 2012, which is hereby incorporated herein by reference in its entirety. U.S. patent application Ser. No. 13/891,619 also is a continuation-in-part of U.S. patent application Ser. No. 13/249,433, filed Sep. 30, 2011, now U.S. Pat. No. 8,764,256, which claims the filing benefit of U.S. provisional application Ser. No. 61/388,747, filed Oct. 1, 2010, which are hereby incorporated herein by reference in their entireties.

FIELD OF THE INVENTION

The present invention relates to exterior mirrors for vehicles and, more particularly, to a lighted exterior mirror assembly.

BACKGROUND OF THE INVENTION

It is known to provide illumination or light sources at the side of the vehicle, such as to provide security lighting or convenience lighting at the side of the vehicle. For example, such lighting devices are described in U.S. Pat. Nos. 6,349,450; 6,550,103; 5,371,659; 5,669,699; 5,823,654 and 5,497,305, which are hereby incorporated herein by reference in their entireties. Typically, such lighting devices provide illumination along the side of the vehicle and down to the ground at the side of the vehicle.

SUMMARY OF THE INVENTION

The present invention provides an illumination module or device for a vehicle, such as for an exterior rearview mirror assembly. The illumination module provides a forward lighting and/or forward turn lighting function via a plurality of illumination sources, such as a plurality of light emitting diodes or the like, disposed in the illumination module.

According to an aspect of the present invention, a lighted exterior rearview mirror system of a vehicle comprises an exterior rearview mirror assembly and a light module disposed at the exterior rearview mirror assembly. The light module comprises a plurality of illumination sources operable to emit light. The illumination sources include a plurality of controlled, such as individually controlled, forward facing lights that are responsive to a user input to provide a user selected or customized illumination pattern or beam direction emanating from the exterior rearview mirror assembly. The illumination sources also include at least one turn signal indicator light and the light module is operable to emit light sidewardly and/or rearwardly of the vehicle when the turn signal indicator light is activated. The light module is disposed at least partially at a forward portion of the mirror casing of the exterior rearview mirror assembly and light emanating from the turn signal indicator light is viewable by a person viewing the mirror assembly from the front of the vehicle.

These and other objects, advantages, purposes and features of the present invention will become apparent upon review of the following specification in conjunction with the drawings.

BRIEF DESCRIPTION OF THE DRAWINGS

FIG. 6 is an exploded view of the housing and lighting module of FIG. 4;

FIG. 7 is another exploded view of the housing and lighting module of FIG. 4, showing a similar view as FIG. 6;

DESCRIPTION OF THE PREFERRED EMBODIMENTS

Figure 1:
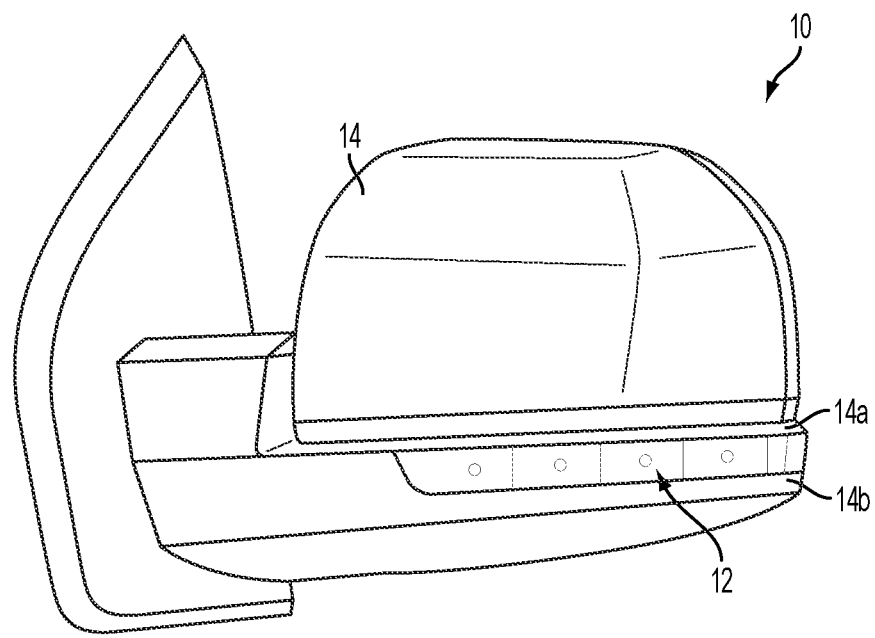
FIG. 1 is a perspective view of a vehicle exterior rearview mirror assembly having a lighting module in accordance with the present invention, shown with the forward lighting lights of the forward lighting module activated.
Figure 2:
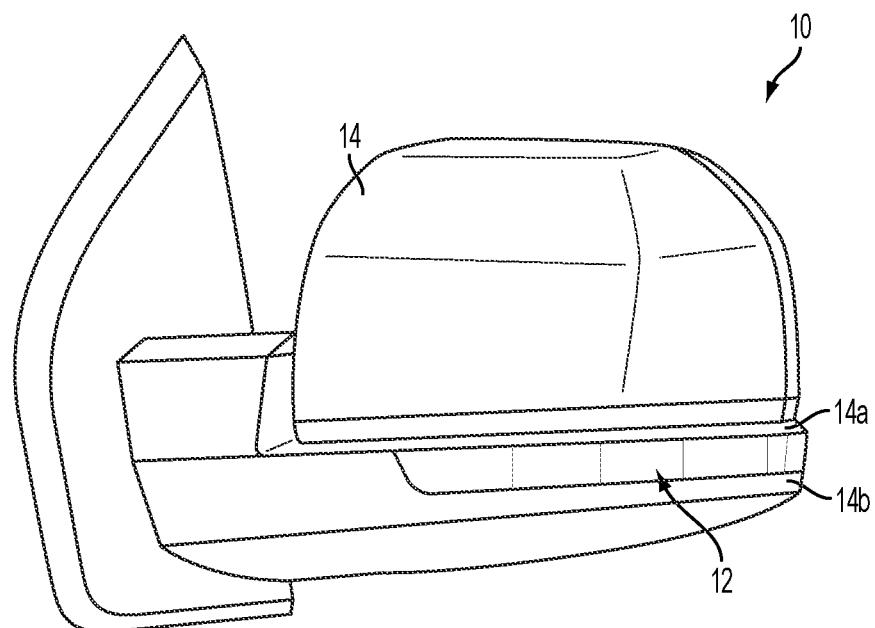
FIG. 2 is another perspective view of the vehicle exterior rearview mirror assembly of FIG. 1, shown with the turn signal light of the lighting module activated.
Figure 3:
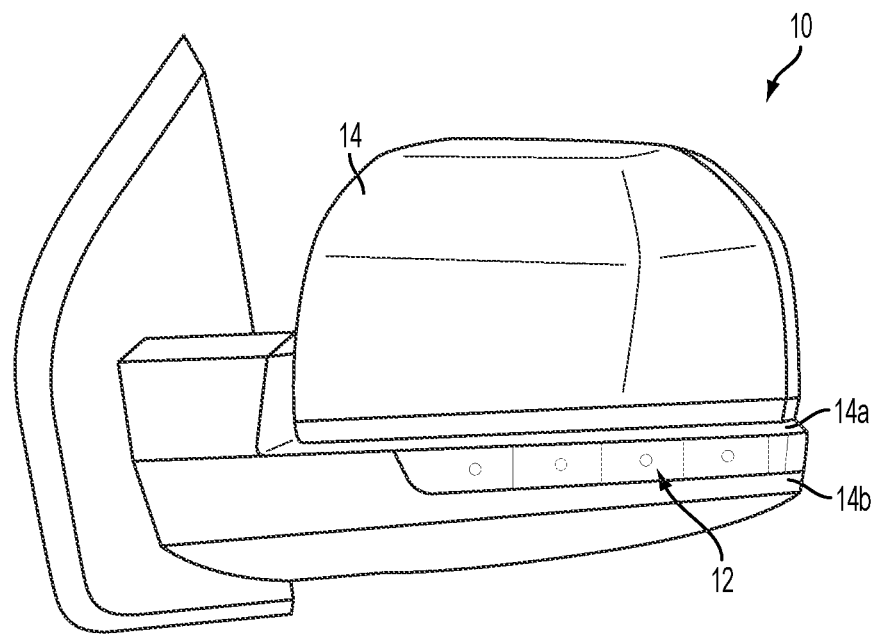
FIG. 3 is another perspective view of the vehicle exterior rearview mirror assembly of FIG. 1, shown with the forward lighting lights and the turn signal light of the lighting module activated.

Referring now to the drawings and the illustrative embodiments depicted therein, a vehicle exterior rearview mirror assembly 10 is mountable at a door of a vehicle and includes a light module 12 (FIGS. 1-3). Light module 12 is disposed at or received in a recess or aperture 14a of the mirror casing 14. In the illustrated embodiment, the aperture 14a is established or formed at least partially at a forward facing portion 14b of mirror casing 14, which faces generally forwardly in the direction of travel of the vehicle when the exterior rearview mirror assembly 10 is normally mounted at the side of the vehicle, and extends towards or to a side portion of the mirror casing 14. The light module 12 includes a plurality of forward lighting illumination sources 16, such as light emitting diodes or the like, and at least one turn signal indicating illumination source 17, such as at least one light emitting diode or the like, and the light module is configured to emit illumination in a generally forwardly and/or sidewardly and/or rearwardly direction when electrically powered. The forward facing illumination sources may be independently and selectively energized at selected or varying intensities to provide a selectable range and intensity of illumination generally forwardly and/or sidewardly and/or rearwardly of the vehicle, such as in response to a user input disposed in the passenger compartment or cabin of the vehicle, as discussed below. The forward facing illumination sources thus may be used as a selectively directed spotlight or a spotlight that is directed or adjusted responsive to an object detection system or the like or optionally the light sources may function as a supplemental headlight used to improve lighting generally forwardly and at the side of the vehicle when the driver is turning the vehicle while traveling in a forwardly direction, such as when making a turn at an intersection or the like. The light module may utilize aspects of the light modules described in U.S. patent application Ser. No. 13/249,433, filed Sep. 30, 2011, now U.S. Pat. No. 8,764,256, which is hereby incorporated herein by reference in its entirety. The light module 12 includes a light guiding or directing or reflecting element or reflector 20 and a light piping and cover element 22, which are configured to provide the desired or selected or appropriate illumination when either or both of the forward lighting illumination sources and/or the turn signal indicator illumination sources are activated or energized, as discussed below.

In the illustrated embodiment, light module 12 includes four forward lighting illumination sources 16, which may comprise four (or more or less) white light-emitting light emitting diodes, and which are disposed on a support element 18 (FIGS. 5-9), such as a plate or circuit board or the like. The light reflecting element 20 has a plurality of openings 20a-d that generally align with the individual forward lighting illumination sources and that is configured to guide or direct or reflect illumination emitted by the forward lighting illumination sources generally forwardly in the direction of travel of the vehicle and/or generally sidewardly of the vehicle. The light reflecting element may comprise any suitable materials, such as a reflector coated or colored plastic or polycarbonate element or a stamped metallic element or the like.

Optionally, the reflecting element may reflect the light to direct or narrow the emitted light to a narrowed or focused beam of light emanating from the light module. For example, the round cone reflectors may comprise any suitable shape and may be formed to direct the light emitted by the illumination source or LED towards a target (for example, the light emitted by the LED may have a field of illumination of about 120 degrees or more and the reflector may direct or focus the illumination to a field of about 45 degrees or less, depending on the particular application and desired beams of illumination). Optionally, the reflectors and/or illumination sources may be adjustable to adjust the field of illumination of the illumination sources (such as by moving towards or away from the illumination sources or reflectors) to provide an adjustable beam of illumination.

Optionally, and as shown in FIGS. 5-9, light module 12 may include a heat sink or heat dissipating structure 34 disposed at or near the support element 18 and illumination sources 16. In the illustrated embodiment, the heat dissipating structure 34 comprises a plurality of fins or ribs 34a that extend away from the support structure to increase the surface area at the rear of the support structure to enhance the dissipation of heat that is generated by the illumination sources 16 (when energized or powered) at the support element 18. As can be seen with reference to FIG. 5, the heat dissipating structure 34 is disposed inside the mirror casing 14, such as in a cavity within the mirror casing, and optionally the mirror casing may be vented to enhance cooling or heat dissipation at the illumination sources and support element and heat dissipating structure. The heat dissipating structure may comprise a separate element that is disposed at or attached at the rear of the support structure (such as via adhesive or the like and in a manner that facilitates heat transfer or heat conductivity between the illumination sources at the support structure to the fins or ribs of the heat dissipating structure. Optionally, the heat dissipating structure may be integrally formed with the support structure. The heat dissipating structure may comprise any suitable thermally conductive material, such as a metallic material or the like.

As shown in FIG. 3, the light reflecting element 20 has four apertures 20a, 20b, 20c, 20d, and may be configured to direct or reflect the emitted illumination (emitted by the respective illumination sources) generally forwardly in a forward direction of travel of the equipped vehicle. Optionally, the light reflecting element and light module may be configured to have the central apertures 20b, 20c direct the emitted illumination generally forwardly in a forward direction of travel of the equipped vehicle, while the inboard aperture or reflecting portion 20a may be angled to direct illumination forwardly and generally inboard toward the side of the vehicle, and the outboard aperture or reflecting portion 20d may be angled to direct illumination forwardly and generally outboard away from the side of the vehicle. Thus, the light module may direct illumination forwardly and sidewardly at the side of the vehicle to provide a wide band of illumination at the respective side of the vehicle and thus may assist the driver in undertaking the forward turning maneuver and/or in illuminating a region selected by the driver (and responsive to a user input that controls the appropriate illumination sources to provide the selected or desired beam of light).

Optionally, and desirably, the individual light sources of the forward lighting light 16 may be individually controlled or powered to provide enhanced lighting at a desired area or region and reduced lighting at other areas. For example, if it is desired to provide greater illumination outboard away from the side of the vehicle, the outboard illumination source at outboard light reflecting portion 20d may be activated or operated or energized at an increased power level and the inboard illumination source at inboard light reflecting portion 20a may be deactivated or operated or energized at a reduced power level (and optionally the intermediate or central illumination sources at the central light reflecting portions 20b, 20c may be powered or not powered depending on the overall light intensity desired for the particular lighting application).

Light module 12 also includes turn signal indicator illumination source 17, which may comprise one or two (or more) white or preferably colored light-emitting light emitting diodes (such as an amber colored light emitting diode or the like), which are disposed on a support element 19 (FIGS. 5-9), such as a plate or circuit board or the like. The turn signal indicator illumination source 17 is disposed at a light receiving end or region of a light pipe and cover element 22 that guides the light emanating from the turn signal indicator illumination source 17 along the light module and out an outboard end region of the light module for viewing by a person to the side and/or rear of the subject vehicle.

Figure 5:
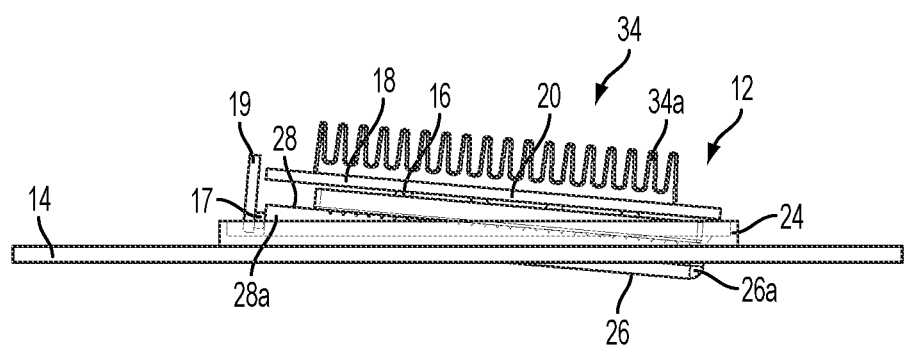
FIG. 5 is a sectional view of the housing of FIG. 4.
Figure 8:
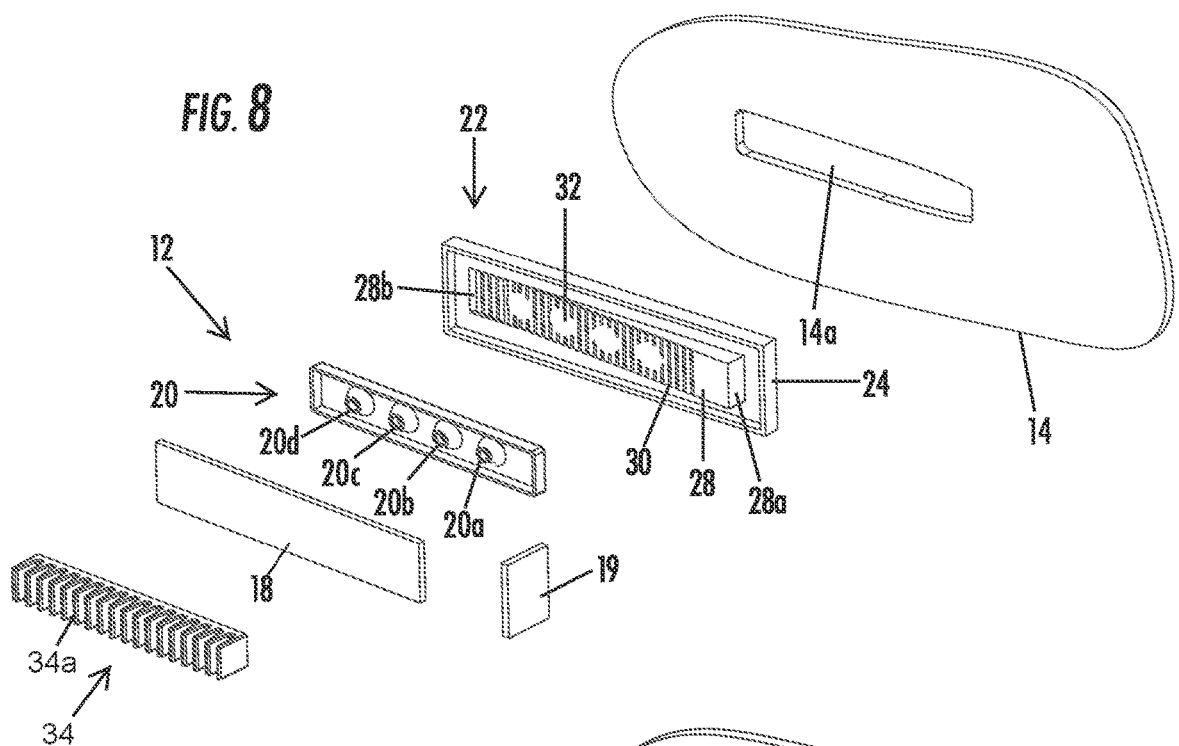
FIG. 8 is an exploded view of the housing and lighting module of FIG. 4.
Figure 9:
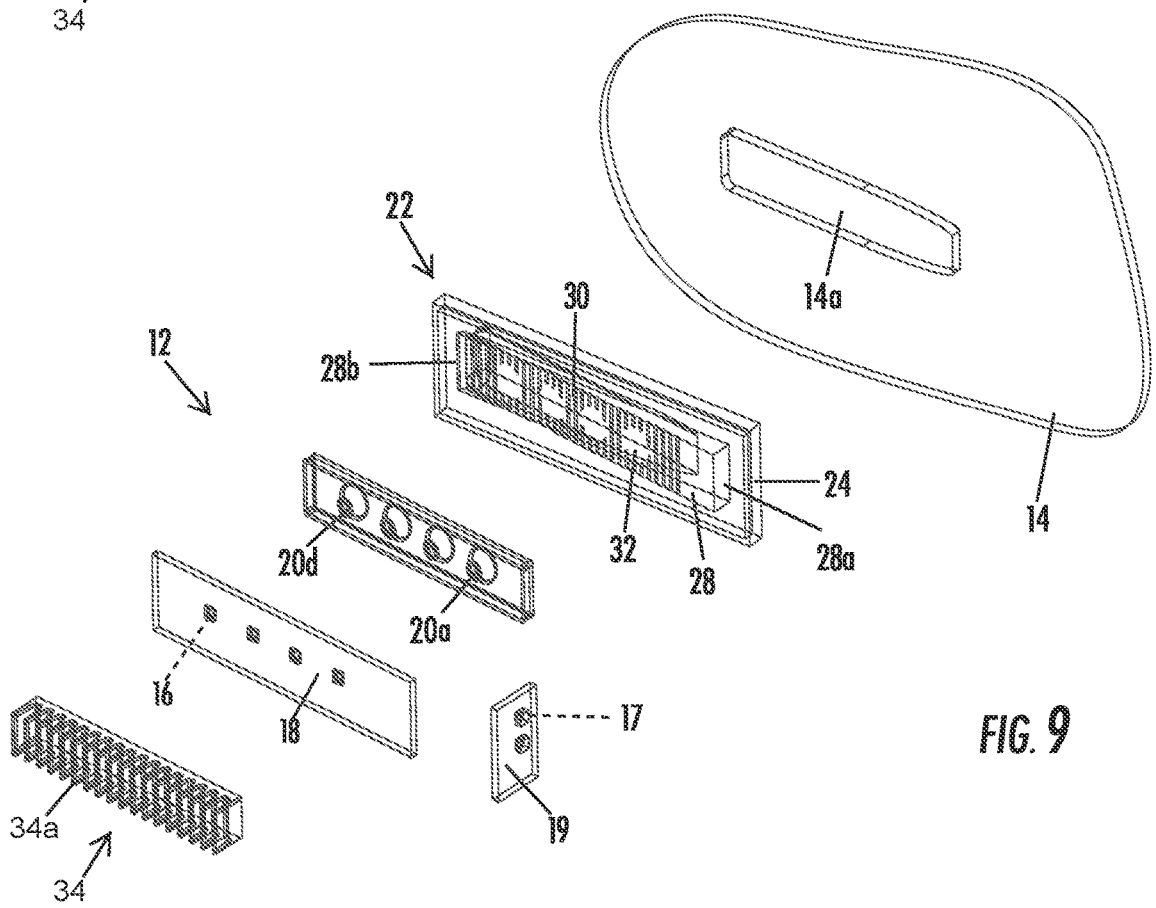
FIG. 9 is another exploded view of the housing and lighting module of FIG. 4, showing a similar view as FIG. 8.

The light pipe and cover element or lens element or translucent or visible light-transmitting cover panel or element 22 is disposed at and/or over the light reflecting element 20 and the support elements 18 and 19 and illumination sources 16 and 17. The light pipe and cover element 22 may be formed to generally correspond with the contours or curvature of the mirror casing 14 of mirror assembly 10 at the aperture 14*a* or may protrude partially from the outer surface of the mirror casing, such as shown in FIG. 5. The light piping and cover element 22 allows the illumination emitted by the illumination sources 16 and 17 and reflected or directed or guided by the light reflecting element 20 and/or the light piping and cover element 22 (which may comprise the likes of a light pipe or light conduit that acts as a light conductor utilizing the likes of total internal reflection) to pass through the light piping and cover element 22 (which may comprise a transparent or translucent or light transmitting plastic or acrylic or polycarbonate material or lens or cover element or the like) so as to illuminate an area or direct illumination towards an area forward and/or sideward and/or rearward of the mirror assembly and/or of the vehicle (depending on which of the light sources is/are activated). The light pipe and cover element thus may provide or include or cooperate to provide a light piping or guiding function to direct visible light emitted by the illumination sources in a desired or appropriate direction to illuminate the desired area forward and/or sideward of the equipped vehicle, as discussed below.

Figure 10:
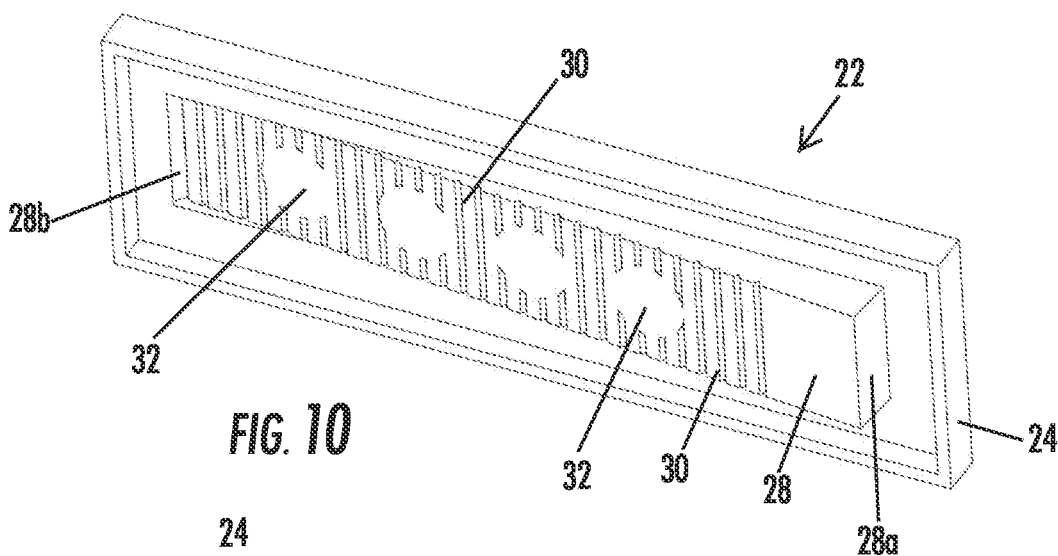
FIGS. 10-12 are perspective views of a light pipe and lens cover of the lighting module of the present invention.
Figure 11:
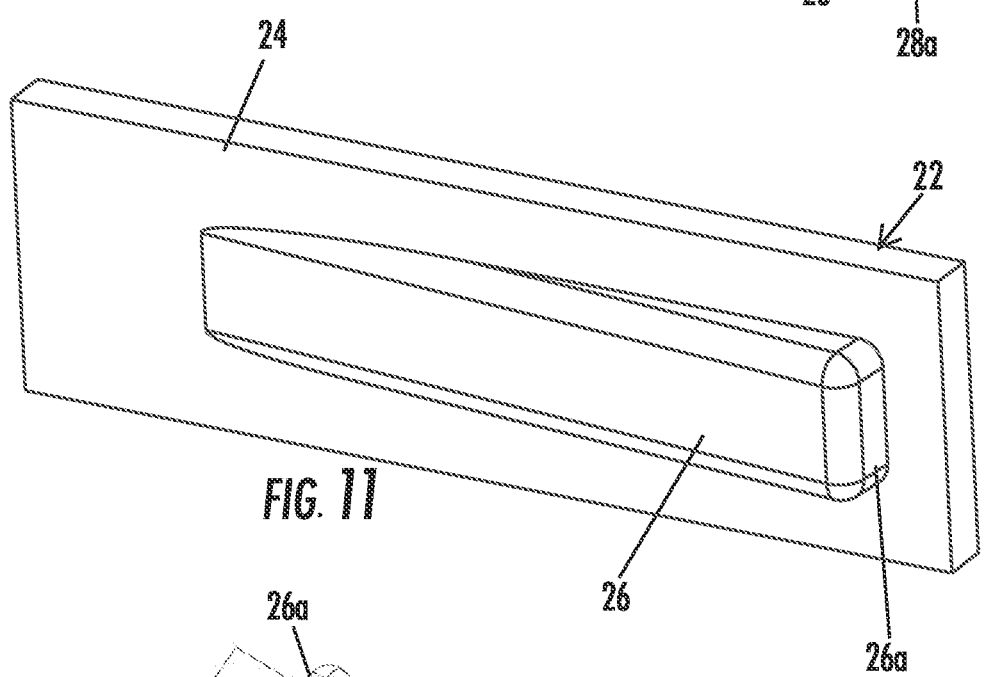
Figure 12:
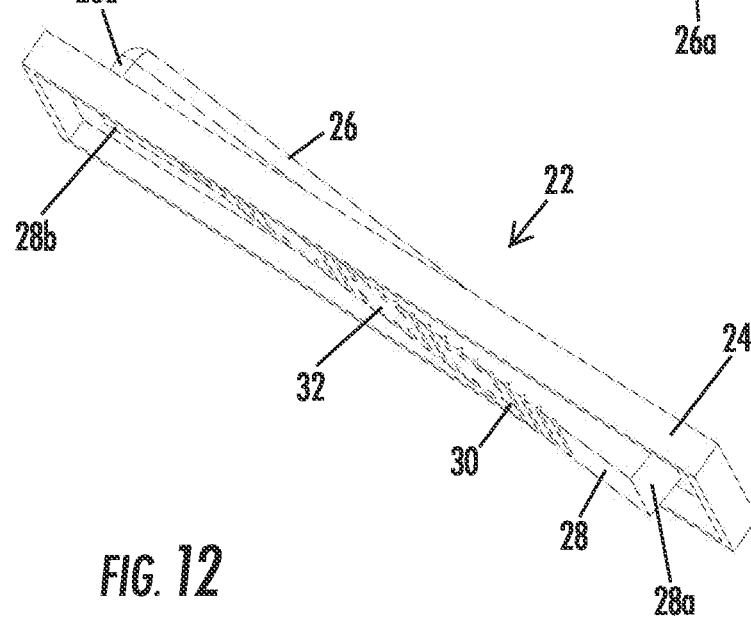
Figure 13:
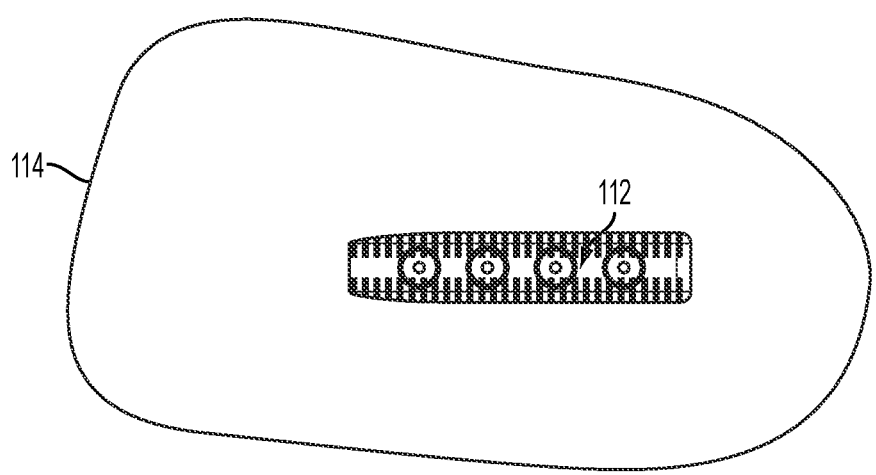
FIG. 13 is a plan view of a mirror housing with another lighting module disposed thereat in accordance with the present invention.
Figure 14:
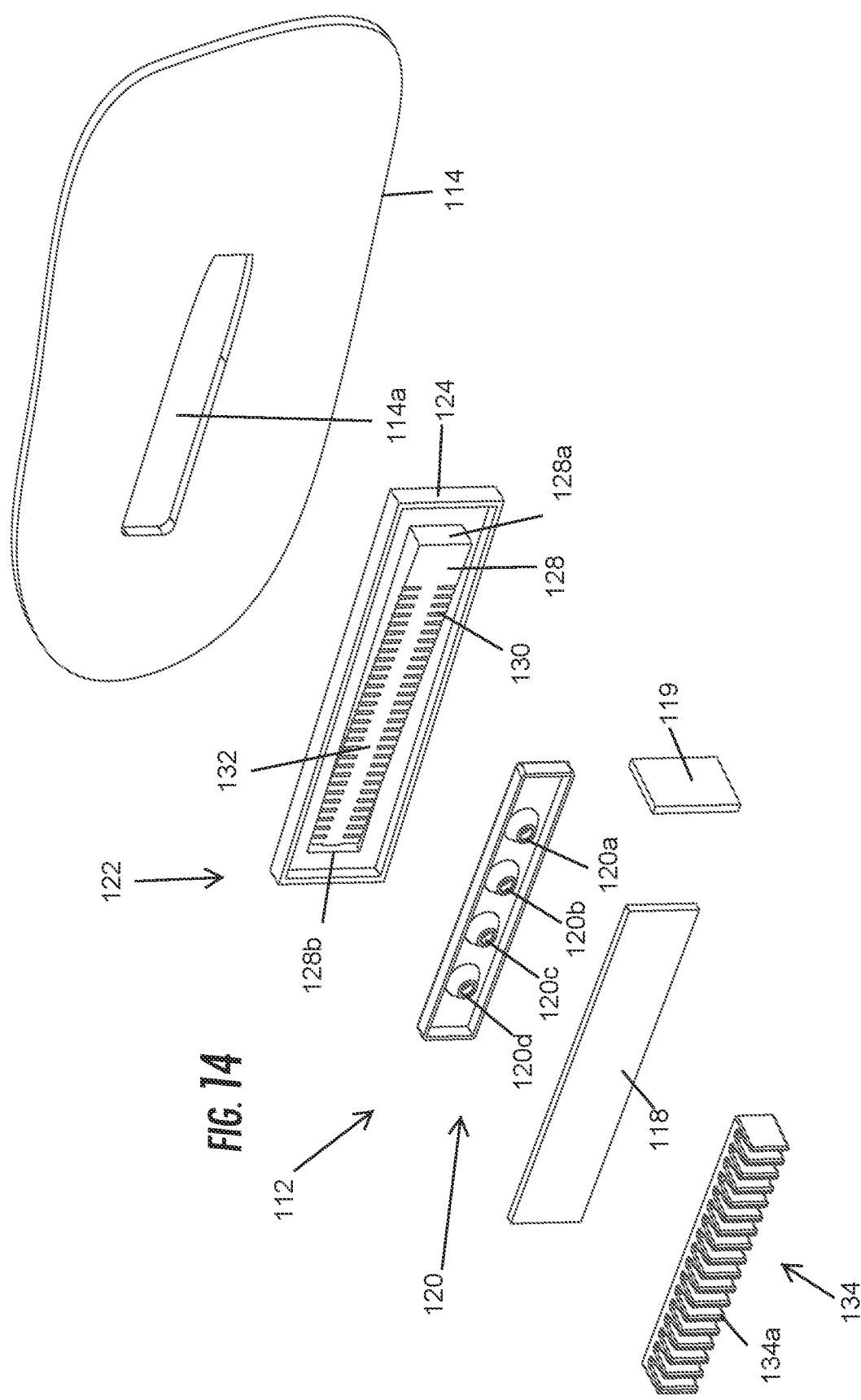
FIG. 14 is an exploded view of the housing and lighting module of FIG. 13.
Figure 15:
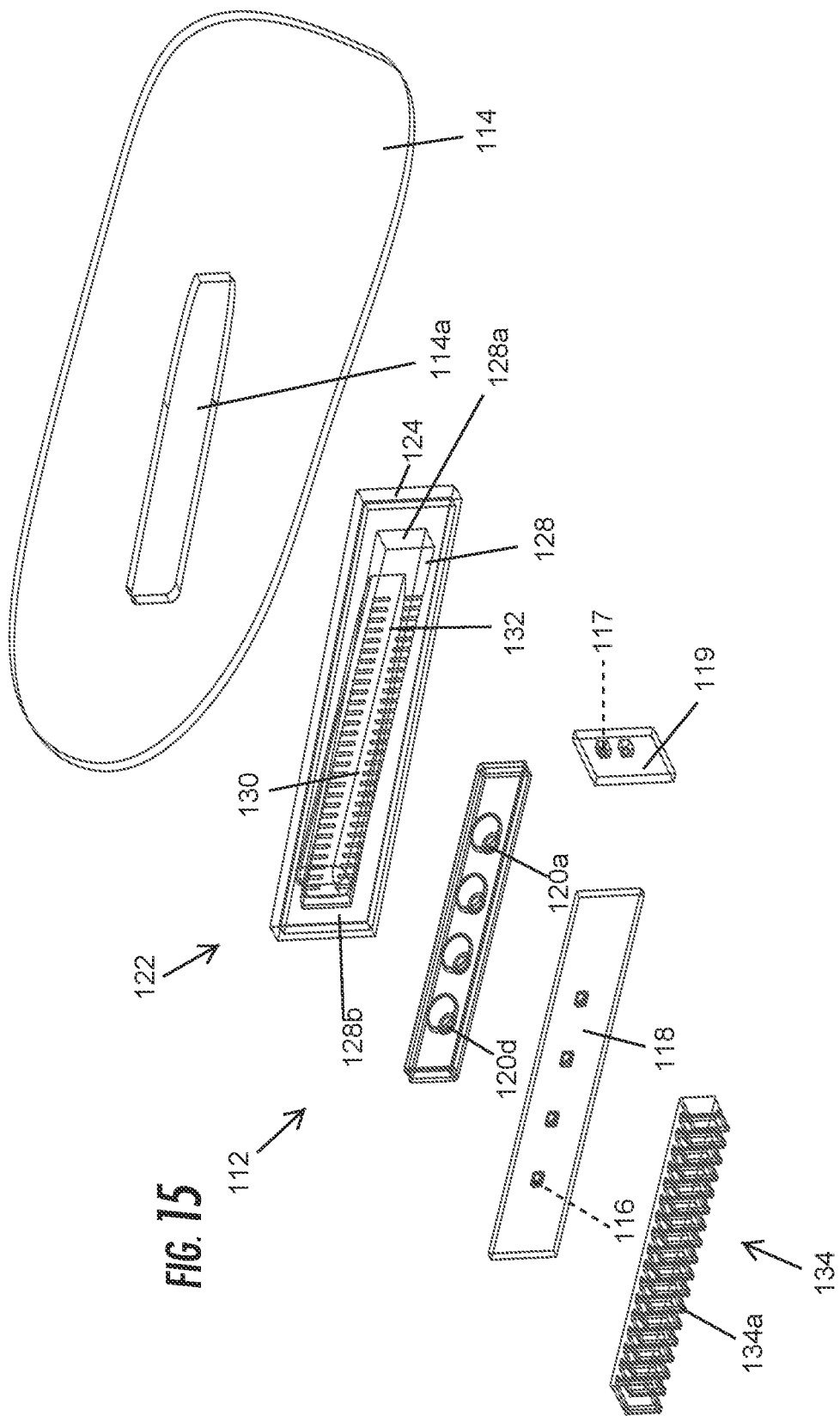
FIG. 15 is another exploded view of the housing and lighting module of FIG. 13, showing a similar view as FIG. 14.
Figure 16:
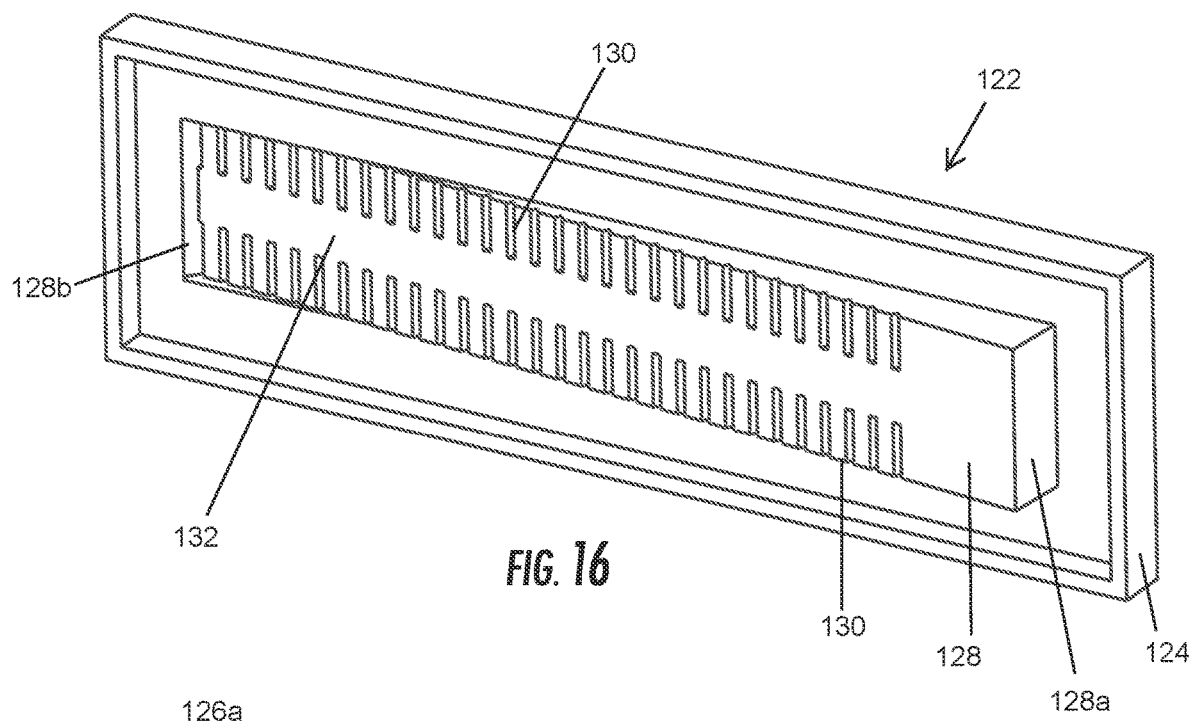
FIGS. 16 and 17 are perspective views of another light pipe and lens cover of the lighting module of the present invention.
Figure 17:
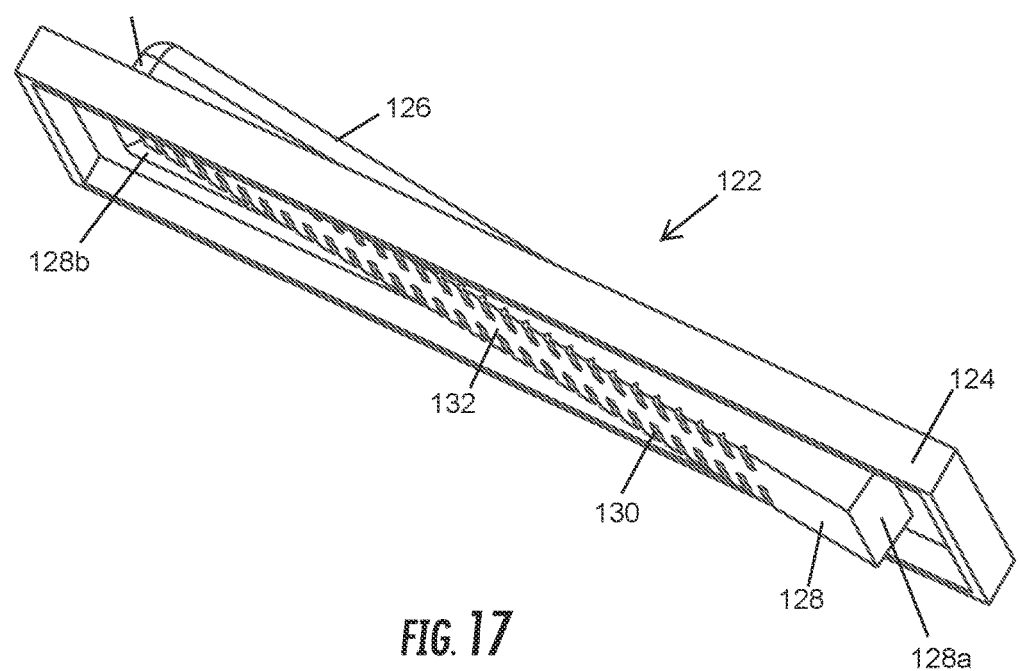

As best shown in FIGS. 10-12, light pipe and cover element 22 comprises a plastic element having a base or plate or mounting portion 24, an outer cover portion 26 and a light piping portion 28, which are all integrally or unitarily molded or formed together. Mounting portion 24 may be disposed at an inner surface of the mirror casing when the light module is attached at the mirror assembly, with the outer cover portion 26 of light pipe and cover element 22 partially protruding through the aperture 14*a* in the mirror casing 14 so as to be viewable at the aperture, with its outboard end protruding from the outer surface of the mirror casing (as shown in FIG. 5). The light piping portion 28 is configured to receive light emanating from the turn signal indicator light source 17 at its inboard end 28*a* and to direct or pipe the light along the element 22 and out an outboard end 28*b* of light piping portion 28, which is at the outboard exposed end 26*a* of the outer cover portion 26. As shown in FIGS. 10-12, the light piping and cover element may comprise a unitary structure that may be molded of a polymeric or plastic material, such as a clear plastic or acrylic material or the like.

Optionally, the light piping portion 28 of light pipe and cover element 22 of light module 12 may include indicating ribs or facets or recesses or textured elements or indicating elements or indication elements 30 that are illuminated and glow or reflect light when the turn signal indicator light source 17 is activated, such that the ribs or elements 30 glow or stand out when the turn signal indicator LED or LEDs is/are activated or energized so that a person viewing the mirror assembly from the front of the vehicle can see when the turn signal indicator light is activated, even in high ambient lighting conditions. The ribs or elements 30 may comprise notches or grooves established (such as during the molding process) along the rear surface of the light piping portion so as to provide a reflecting surface or light collecting element in the light piping portion that impinges on the light path of the light emanating from the turn signal indicator light source 17 as the light passes along the light piping portion 28. The ribs or elements 30 are formed as part of the light pipe and cover element 22, and comprise a clear or translucent plastic material that reflects the light emanating from turn signal indicator light source 17 as the light is guided along the light piping portion 28 towards the outboard end of the light module, and thus provide a greater intensity light indicator that is viewable from the front of the mirror assembly and vehicle. The plurality of ribs or elements 30 established in the light piping portion 28 are spaced along the rear surface of the light piping portion and, as best shown in FIG. 10, the rear surface may have non-ribbed or non-textured or smooth portions 32 that generally coincide with or align with the individual light emitting diodes of the forward facing light source 16 when the light module is assembled.

Thus, when the light module 12 is assembled, the turn signal indicator light source 17 is disposed generally at inboard end 28*a* of light piping portion 28 of light piping and cover element 22 (such as at or near the end of the cover element that is inboard or closest to the side of the vehicle at which the mirror assembly is mounted), while the individual LEDs of the forward lighting light source 16 are disposed at and behind the non-ribbed or non-textured portions 32 of the light piping portion 28. The light pipe and cover element 22 functions to guide the light emitted by the illumination source 17 sidewardly and out of the opposite or outboard end of the light pipe and cover element 22 (and at a location where the outer cover portion 26 protrudes or is proud of the mirror casing 14, such that light emanating from the end 28*b* of the light pipe portion 28 is directed generally sidewardly (and optionally rearwardly) of the vehicle so as to be viewable by a person viewing the mirror assembly from a vehicle at the side and/or rearward of the subject or host or equipped vehicle. The light piping portion 28 thus guides light emanating from the turn signal indicator light source 17 from a location inside the mirror casing (at inboard end 28*a* of light piping portion 28) to a location outside the mirror casing (at outboard end 28*b* of light piping portion 28), while also illuminating the ribs or elements 30 so that a person viewing the mirror assembly from the front and/or side and/or rear of the mirror assembly can see when the turn signal indicator light source is activated, such as in response to the driver of the subject vehicle activating a turn signal of the vehicle.

Although shown and described as having generally vertically oriented ribs and generally circular shaped non-ribbed or non-textured or smooth portions, the light piping and cover element may comprise any suitable indication structure or elements and any suitably-shaped smooth or non-ribbed portions, while remaining within the spirit and scope of the present invention. For example, and with reference to FIGS. 13-17, a light module 112 includes a light guiding or directing or reflecting element or reflector 120 and a light piping and cover element 122, which are configured to provide the desired or selected or appropriate illumination when either or both of the forward lighting illumination sources 116 (disposed on support element or circuit board 118) and/or the turn signal indicator illumination sources 117 (disposed on support element or circuit board 119) are activated or energized, such as in a similar manner as discussed above. In the illustrated embodiment, the light piping portion 128 of the light pipe and cover element 122 of light module 112 includes indicating ribs or facets or textured elements or indicating elements or indication elements 130, while the non-ribbed or smooth portion or channel portion 132 comprises a channel or generally linear region along the light piping portion that is generally linearly aligned with the illumination sources 116 and openings 120a-d. The channel portion 132 thus divides or separates or demarcates the facets or ribs or indication elements 130 into two separate arrays of turn signal optical facets or indication elements along the upper and lower regions of the light module. The light module 112 may otherwise be substantially similar to light module 12, discussed above, such that a detailed discussion of the light modules need not be repeated herein.

Similar to light module 12, the light pipe and cover element 122 comprises a plastic element having a base or plate or mounting portion 124, an outer cover portion 126 and a light piping portion 128, which are all integrally or unitarily molded or formed together. The light piping portion 128 is configured to receive light emanating from the turn signal indicator light source 117 at its inboard end 128a and to direct or pipe the light along the element 122 and out an outboard end 128b of light piping portion 128, which is at the outboard exposed end 126a of the outer cover portion 126. Optionally, the light module 112 may include a heat sink or heat dissipating structure 134 (having a plurality of fins or ribs 134a) disposed at or near the support element 118 and illumination sources 116.

Figure 3A:
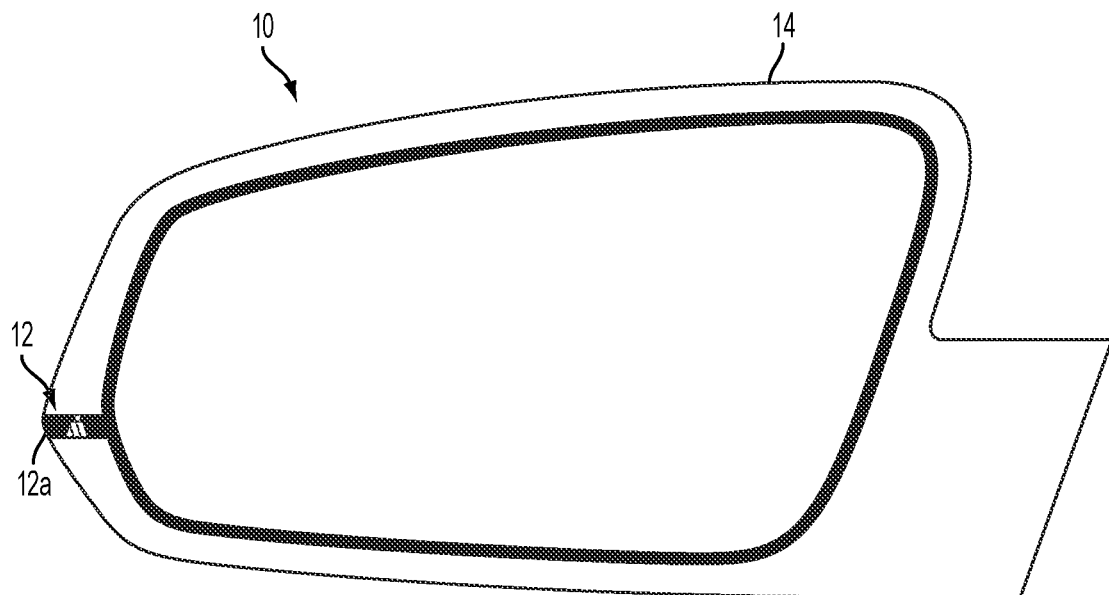
FIG. 3A is a rear elevation of the vehicle exterior rearview mirror assembly of FIG. 1, with a backlit logo viewable at the outboard end of the lighting module so as to be backlit when the turn signal light of the lighting module is activated.
Figure 4:
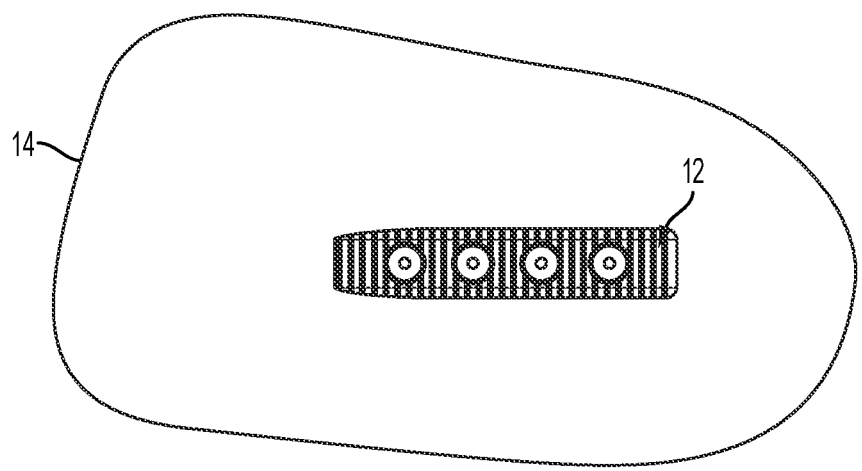
FIG. 4 is a plan view of a mirror housing with a lighting module disposed thereat in accordance with the present invention.

Thus, and as shown in FIG. 1, when one or more of the light emitting diodes of the forward lighting illumination source 16 are activated, the light module 12 provides a forwardly directed and/or sidewardly directed and/or selectively directed beam of light (such as responsive to a user input and/or such as in a similar manner as described in U.S. patent application Ser. No. 13/249,433, filed Sep. 30, 2011, now U.S. Pat. No. 8,764,256, which is hereby incorporated herein by reference in its entirety). As shown in FIG. 2, when the turn signal indicator light source 17 is activated, the light module may be viewed as a colored strip or a plurality of colored elements or ribs (due to colored light emitted by the turn signal indicator light source reflecting along the light piping portion and reflecting off of the ribs or notches formed in the light piping portion) from the front of the mirror assembly and vehicle, and the light module may emit light (from the outboard end of the light guiding element and cover panel) for viewing by a person in another vehicle at the side and/or rear of the subject vehicle. As shown in FIG. 3, when both the forward facing illumination source 16 and the turn signal indicator illumination source 17 are activated, the light module may have the colored appearance, with white light emanating from the individual actuated LEDs of the forward facing illumination source 16. Optionally, and as shown in FIG. 3A, the outboard end 12a of the light module 12 (such as at the outboard end of the light piping portion or element) may have an icon or logo or indicia established thereat so that the icon is backlit and thus viewable to a person viewing the mirror assembly (such as from the side or rear of the vehicle) when the turn signal indicator light source is activated.

Optionally, and as shown in FIG. 5, the outboard end 26a of the cover portion 26 of the light module may be exposed at the outboard region of the mirror casing and/or may protrude outwardly from the casing. Optionally, the light pipe and cover element 22 may have an icon or indicia established at the end 26a of the cover portion 26. Thus, when the turn signal indicator light source 17 is activated, the light emanating therefrom is guided or piped along the light module and functions to backlight the icon so as to provide a backlit iconistic element that is viewable by a person viewing the outboard end or region of the mirror assembly, such as from another vehicle at the side of or rearward of the subject vehicle. Optionally, the icon may comprise a vehicle manufacturer logo or vehicle model logo or any suitable or desired icon or indicia to provide the desired indicator for the mirror assembly, depending on the particular application of the mirror assembly and light module. The backlit icon and light module may utilize aspects of the light modules and assemblies described in U.S. Pat. Nos. 8,333,492; 5,371,659, 5,669,699, 5,823,654 and 5,497,305, and/or U.S. patent application Ser. No. 13/249,433, filed Sep. 30, 2011, now U.S. Pat. No. 8,764,256, and/or Ser. No. 13/674,458, filed Nov. 12, 2012, now U.S. Pat. No. 8,801,245, which are hereby incorporated herein by reference in their entireties.

In the illustrated embodiment, the spotlight or forward lighting support element or circuit board 18 may be attached at the rear side or surface of the light reflecting element 20, such as via a snap connection or fastenerless connection or the like. Likewise, the turn signal support element or circuit board 19 may be attached at the side or end surface of the light pipe and cover element 22, such as via a snap connection or fastenerless connection or the like. Also, the cover element 22 may be attached at the front side or surface of the light reflecting element 20, such as via a snap connection or fastenerless connection or the like. Optionally, an outer casing or housing may attach at the rear of the base or mounting portion 24 of cover element 22 to house and seal the circuit boards 18, 19 and circuitry inside the light module. The light module 12 thus may comprise a unitary module that may be readily attached to the mirror assembly at the aperture 14a of mirror casing 14, such as via a snap connection or fastenerless connection or the like (or via one or more fasteners, depending on the particular application of the light module).

Optionally, electrical connection may be made between the circuit boards 18 and/or 19 (or circuitry or electrical connectors thereat or thereof) and one or more electrical connectors of the mirror assembly or vehicle that are disposed in or at the mirror casing at or near the aperture 14a when the light module is installed in the mirror assembly. The light module 12 thus may be electrically connected to a power source and/or control of the vehicle or mirror assembly, whereby the illumination sources 16 may be powered or unpowered or controlled via a control circuit of the mirror assembly or of the vehicle. Optionally, the light module may be mechanically secured within the pocket or recess or opening at the mirror casing, such as via a snap connection or fastener or the like, and may be electrically connected to a vehicle control system and/or vehicle power source. Optionally, the electrical connection and mechanical connection of the self-contained light module may be made as the light module is snapped or otherwise inserted or mounted or attached to the mirror casing of the mirror assembly, such as by utilizing aspects of the accessory modules described in U.S. Pat. Nos. 6,669,267; 6,969,101; 6,824,281 and/or 7,188,963, which are hereby incorporated herein by reference in their entireties. When snapped or otherwise secured to the mirror assembly, the exterior surface of the light module may generally or substantially correspond to the contours of the mirror casing or housing of the mirror assembly so as to be substantially flush mounted at the mirror assembly and/or a portion of the light module may protrude outwardly from the exterior surface of the mirror casing so as to enhance viewability of the turn signal indicator light to a person viewing the mirror assembly from the side and/or rear of the subject vehicle. Optionally, the lighted exterior rearview mirror assembly may comprise a breakaway mirror assembly having a folding or movable portion (that houses or supports the reflective element) and a non-folding part or portion (that attaches to the side of the vehicle equipped with the mirror assembly). In the illustrated embodiment, the light module is disposed at the folding part of the mirror assembly (and is disposed partially within the mirror housing or casing of the folding part), but optionally the light module may be disposed at the non-folding part of the exterior rearview mirror assembly (such as at a lower region of the non-folding mirror part or at a forward region of the non-folding mirror part or the like), while remaining within the spirit and scope of the present invention.

Optionally, the illumination sources 16 and/or 17 may comprise dual-dye light emitting diodes and, responsive to a selected voltage or signal, may emit white light (such as responsive to a signal generated in response to actuation of the user input in the vehicle) or may emit amber (or other desired color) light (such as responsive to a signal generated in response to actuation of the vehicle turn signal actuator). Optionally, for example, the light module may operate in conjunction with or corresponding to a selected custom color for the interior lighting of the vehicle (such as MYCOLOR® offered by Ford Motor Company), whereby the illumination color emitted by the illumination sources of the exterior mirror light module may be selected or customized by the user to a desired color or color combination.

The illumination sources 16 (such as the four or six or any other desired or appropriate number of white light-emitting light emitting diodes or the like) may be controlled using pulse width modulation (PWM). Optionally, by varying the duty cycle of the individual illumination sources, the light module, when activated, can create the impression that the light is begin adjusted horizontally (such as via individual control of the intensities of the individual illumination sources). Optionally, it is envisioned that the light module may be steerable or aimed via mechanical means, such as via adjusting the orientation of the individual illumination sources or via moving or adjusting the reflector or light guiding element or the like, such as in response to a user input as discussed below.

Optionally, the light module 12 may be responsive to a user input within the vehicle cabin, such as at the instrument panel of the vehicle (and such as in a similar manner as described in U.S. patent application Ser. No. 13/249,433, filed Sep. 30, 2011, now U.S. Pat. No. 8,764,256, which is hereby incorporated herein by reference in its entirety). The user input may comprise a dial or knob or electrical switch that is adjusted to a number of different settings. Thus, when the light module is activated (such as via actuation of an "on/off" switch or input in the vehicle cabin), the user or driver of the vehicle may control or adjust the user input to select a desired or appropriate lighting configuration or illumination pattern emitted by the illumination sources 16 of light module 12. For example, the user input may comprise a dial or knob that is rotated by the user in either direction from a center or "full on" setting to either the right direction (to illuminate the inboard LEDs of the driver side mirror more than the outboard LEDs of the driver side mirror) or the left direction (to illuminate the outboard LEDs of the driver side mirror more than the inboard LEDs of the driver side mirror). The user thus can pan the principal illumination beam left to right and right to left via adjustment of the knob or dial or user input. For example, the user input may be selectively adjusted to any one of about fifty positions (or more or less depending on the particular application and desired adjustability), whereby each LED or illumination source may be energized to a predetermined level responsive to the particular setting or position of the user input. The lighting system may include a control or microprocessor on the circuit board of the light module or elsewhere in or at the mirror or vehicle, and the control may be responsive to the signal from the user input and operable to power one or more of the illumination sources in accordance with a the selected input or setting or position of the user input. Optionally, the user input may also be set to a "full on" position or setting whereby all four or six illumination sources (or any other number of illumination sources, such as more than two LEDs, such as eight or ten LEDs, but preferably less than about 20 LEDs, depending on the particular application) may be operated or energized at or near a 100 percent level or intensity.

Optionally, it is envisioned that the light module may include a two dimensional array of illumination sources (such as two or more rows of illumination sources, such as two rows of three LEDs or the like), and the user input may comprise a toggle or joystick type control, whereby a user may direct or adjust or control or aim an illumination pattern or principal illumination beam to direct light upward and/or downward as well as forward/sideward, to provide a desired or selected illumination pattern by the vehicle. The joystick control may be similar to a control or input for adjustment of the exterior mirror reflective element, and may be at or near the exterior mirror controls so that the user may readily understand what control function the control or input provides. Optionally, a light module may be disposed at each of the driver side and passenger side mirror assemblies, and each light module may be associated with a respective control or user input or a single user input or control may selectively control a selected one of the light modules (such as via a selection switch similar to the selection switches used to select which reflective element actuator is controlled by a mirror adjustment control).

Thus, the illumination sources of the light module 12 may be selectively actuated or energized to provide a desired illumination pattern at the side and forwardly of the vehicle (so that the user of the vehicle may selectively activate and "steer" or aim a principal illumination beam toward a desired or selected or targeted area). Optionally, the illumination pattern when all of the illumination sources are powered may encompass a region that includes a forward portion of the vehicle and that extends partially rearward of the rearview mirror at which the light module is installed (such as a range of at least about 120 degrees, more preferably at least about 130 degrees with four LEDs and at least about 155 degrees with six LEDs, such as from about 10 degrees or more rearward to about 20 degrees or more beyond the longitudinal axis of the vehicle). Actuation or energization of fewer than all of the illumination sources may adjust the illumination pattern to encompass any subset or sub-region of the overall illumination area, depending on the desired illumination direction and intensity for the particular application. The light module and lighting system of the present invention thus may provide a selectable and adjustable and customizable lighting pattern for a driver or user of the vehicle so as to provide a desired illumination pattern for any given situation. For example, the lighting system of the present invention may be highly suitable for use in camping applications (such as to provide or direct light to assist in late night setting up of a tent or camp fire or the like) or farming applications (such as to provide or direct light to assist in herding animals or land surveillance or the like) or construction applications (such as to provide or direct light to assist in road repair or land surveillance or the like) or vehicle maintenance applications (such as to provide or direct light to assist in changing a tire or general vehicle inspection or the like) or tailgating or the like. The driver of the vehicle thus may readily adjust the control or user input within the vehicle to adjust or select or customize the intensity of the beam and/or the pointing and/or principal axis of the beam so as to provide, for example, localized illumination/interrogation of a given object and/or location and/or scene exterior of the vehicle in an up to 180 degree arc relative to the side of the equipped vehicle.

The present invention thus provides a customizable or adjustable or user controllable spotlight at the exterior rearview mirror assembly, such that a user, sitting in the vehicle cabin, can direct illumination towards a desired or targeted region or area or object generally forwardly and/or sidewardly of the vehicle. The aiming and/or illumination and/or type of pattern or illumination beam can be user selected or customized or may be responsive to an object detection or other auto detection device (such as an imaging sensor or camera, or radar sensor, or ultrasonic sensor, or infrared sensor or the like) so as to provide enhanced illumination of a detected object to enhance imaging of a detected object and/or identification of a detected object forwardly and/or sidewardly of the vehicle.

The user selected illumination range or light pattern may be selected or customized to any desired pattern or intensity within the overall illumination range, or may be directed sideward of the vehicle when the light module is disposed in a foldable or breakaway mirror assembly (such as a powerfold mirror assembly or the like) and when the mirror is in its folded orientation. For example, the light module may provide a side area illumination feature when the exterior mirror (such as a powerfold exterior mirror) is folded inward to its folded orientation. When the mirror is folded in this manner, the illumination sources of the light module may all be actuated or energized to a desired or selected intensity to provide a side area illumination pattern along the side of the vehicle. The light module may provide such a side area lighting feature automatically in response to a passive entry system or key fob signal or the like, so as to provide side area illumination when the driver of the vehicle approaches the vehicle. For example, when the system detects the approach of the driver, such as responsive to a passive entry system or responsive to receiving a key fob signal or the like, the system may fold or pivot the mirror head to the folded orientation and actuate the illumination sources of the light module, in order to provide illumination at the side of the vehicle. Optionally, the system may only provide such side illumination when the system also detects a low ambient lighting condition, such as responsive to an ambient light sensor of the mirror assembly or vehicle. Optionally, the system may provide such a side illumination feature responsive to user inputs in the cabin of the vehicle, such as via a powerfold actuator switch and user inputs, discussed above. Optionally, the light module or lighting system may be used or energized in combination with other lighting sources of the vehicle and/or the mirror assembly, such as with, for example, a ground illumination light of the mirror assembly or door handle of the vehicle and/or a cargo lamp of the vehicle and/or the like.

Optionally, the exterior rearview mirror assembly may include a camera or imaging sensor that may be part of a multi-camera system, such as an object detection system or a surround view or "bird's eye view" display system or a Japan View™ vision system or the like (now common in exterior mirrors used in Japan where a video camera is located in the exterior mirror assembly at the side of a vehicle and viewing generally downwardly to allow the driver of the vehicle to view on an interior-cabin mounted video screen whether the likes of a child might be present in the blindzone to the side of the vehicle), such as by utilizing aspects of the vision systems described in U.S. patent application Ser. No. 13/333,337, filed Dec. 21, 2011 and published Jun. 28, 2012 as U.S. Publication No. US-2012-0162427, and/or PCT Application No. PCT/US10/25545, filed Feb. 26, 2010 and published Sep. 2, 2010 as International Publication No. WO 2010/099416, and/or PCT Application No. PCT/US10/47256, filed Aug. 31, 2010 and published Mar. 10, 2011 as International Publication No. WO 2011/028686, and/or PCT Application No. PCT/CA 12/000378, filed Apr. 25, 2012 and published Nov. 1, 2012 as International Publication No. WO 2012/145822, and/or PCT Application No. PCT/US2011/062834, filed Dec. 1, 2011 and published Jun. 7, 2012 as International Publication No. WO 2012/075250, and/or PCT Application No. PCT/US2012/048993, filed Jul. 31, 2012 and published Feb. 7, 2013 as International Publication No. WO 2013/019795, and/or PCT Application No. PCT/US11/62755, filed Dec. 1, 2011 and published Jun. 7, 2012 as International Publication No. WO 2012-075250, and/or PCT Application No. PCT/US2012/066571, filed Nov. 27, 2012 and published Jun. 6, 2013 as International Publication No. WO 2013/081985, and/or PCT Application No. PCT/US2012/068331, filed Dec. 7, 2012 and published Jun. 13, 2013 as International Publication No. WO 2013/086249, and/or PCT Application No. PCT/US2013/022119, filed Jan. 18, 2013 and published Jul. 25, 2013 as International Publication No. WO 2013/109869, which are hereby incorporated herein by reference in their entireties. Thus, the multi-camera vision system may provide a video display of images captured by an exterior mirror-mounted camera and may function to detect the presence of an object or child or the like at the side of the vehicle (and/or forwardly and/or rearward of the vehicle). The light module of the present invention can be used in conjunction with such a vision system to have its principal illumination beam directed towards the area within the field of view of the camera to enhance imaging and/or to enhance detection and/or identification and/or interrogation of objects in the camera's field of view generally at the side of the vehicle and optionally forwardly and/or rearwardly of the vehicle.

Optionally, the illumination sources may be automatically powered or activated or controlled in response to activation of the vehicle headlamps and/or in response to a signal indicative of the vehicle turning (such as a steering wheel angle or the like). For example, the illumination sources of a light module in a driver side exterior rearview mirror assembly may be automatically actuated in response to a condition that involves (a) the headlights of the vehicle being on, (b) the vehicle being in a forward gear or the gear actuator being in a forward gear position, and (c) the vehicle undertaking a forward left turn or the driver actuating a turn signal of the vehicle. Optionally, the illumination sources may be actuated in response to an ambient light sensor that generates a signal indicative of the ambient light at the vehicle being below a threshold level (such that the illumination sources are activated in low lighting conditions during a vehicle forward turning maneuver even if the headlamps are not activated). Such a control system thus may automatically activate or power either light module only when the conditions are appropriate for providing illumination at the respective side of the vehicle so as to assist the driver in undertaking the forward turning maneuver. Optionally, the illumination sources may also or otherwise be powered or activated or controlled in response to a user input or the like, such as a switch or button or the like in the vehicle cabin that is accessible by and actuatable by the driver of the vehicle when the driver is normally operating the vehicle.

Optionally, the illumination sources 16 (such as the four or six or any other desired or appropriate number of white light-emitting light emitting diodes or the like) may be controlled using pulse width modulation (PWM). Optionally, by varying the duty cycle of the individual illumination sources, the light module, when activated, can create the impression that the light is begin adjusted horizontally (such as via individual control of the intensities of the individual illumination sources). For example, at the initial onset of a turn towards a particular side of the vehicle, the inboard illumination source may be initially powered at a greater intensity relative to the central and outboard illumination sources (and optionally one or more of these illumination sources may initially not be activated or powered), and then as the turn progresses (such as responsive to an increase in steering wheel angle or the like), the inboard illumination source may be dimmed while the intensities of the central illumination sources are increased and as the turn further progresses, the outboard illumination intensity may be increased, such that, to a person viewing the illumination module at the mirror assembly, the illumination module appears to have a light source that is adjusted horizontally from an inboard directing orientation to an outboard directing orientation. Optionally, the light module and/or illumination sources may have a dimming control feature or function, such that the illumination sources, when powered or activated, are ramped up or progressively powered up to their full illumination states, and when unpowered or deactivated, are ramped down or dimmed or progressively powered down to their deactivated states. Such a dimming control feature provides a smoother transition when progressively illuminating or powering the illumination sources to give the appearance of movement of an illumination source generally horizontally during the turning maneuver.

Thus, the light module may comprise a cornering light module or assembly to provide illumination generally forwardly and sidewardly of the vehicle to provide enhanced illumination during turning maneuvers of the vehicle. The side lighting functions to improve the vision of the driver of the vehicle when turning the vehicle around a corner or curve in the road. The light module may operate in conjunction with the respective turn signal so as to be activated when the turn signal at that side of the vehicle is activated. The light module may provide a constant illumination at the side of the vehicle while the turn signal flashes. Optionally, the light module may provide a sideward illumination in response to the high beams of the vehicle being activated, in order to provide additional lighting of the road or shoulder sidewardly of the vehicle and rearward of the area encompassed by the front headlights when in their high beam state. In such an application, the sideward lighting function may be deactivated when the headlights are in their low beam state.

Optionally, the illumination sources (such as a row of lights with some of the lights illuminating further sidewardly than some of the other lights) may illuminate in a progressively outward direction depending on the position or steering angle of the steering wheel or front wheels/tires of the vehicle, and then the lights may progressively deactivate in the opposite direction as the steering wheel and/or wheels/tires are turned back to a center or straight orientation. Thus, the lights may illuminate a greater sideward area in response to a detection of the vehicle undergoing a sharper turn so as to enhance the viewing by the driver of the area to the side of the vehicle and toward where the vehicle is being steered, while limiting sideward illumination when the vehicle is being driven in a generally straight or slightly curved path.

Optionally, the illumination sources of the light module may emit illumination in response to other triggering or activating devices or events, such as responsive to a passive entry system or the like of the vehicle so as to provide illumination at the side of the vehicle when the driver approaches the vehicle or touches or moves the door handle of the vehicle door or actuates a remote keyless entry module or passive entry device of the vehicle or inserts a key into a keyhole at the door or door handle or when a motion detector of the vehicle detects a motion at the vehicle, or the like. Optionally, and desirably, the illumination source is deactuatable following a period of time after such an actuation of the illumination source. Optionally, the light module and/or illumination source or sources may have a dimming control feature or function, such that the illumination source, when activated, is ramped up or progressively powered up to its full illumination state, and when deactivated, is ramped down or dimmed or progressively powered down to its deactivated state.

The illumination source may comprise any suitable illumination source, such as one or more light emitting diodes (LEDs), such as white light-emitting LEDs or high intensity power LEDs (such as the types described in U.S. Pat. Nos. 7,195,381 and/or 6,690,268, which are hereby incorporated herein by reference in their entireties) or organic light emitting diodes (OLEDs) or the like. The illumination source may comprise a substantially white light emitting illumination source, or may comprise a colored light emitting illumination source (or a white light emitting illumination source may emit light that passes through a color filter or the like) to provide color illumination (such as blue or amber or other color as desired) at the mirror assembly and ground area depending on the particular application of the mirror assembly and illumination module.

The light module may comprise a small, self-contained module that includes the outer cover or casing that substantially encases the illumination source and circuitry of the light module, and may utilize aspects of the illumination modules described in U.S. patent application Ser. No. 13/249,433, filed Sep. 30, 2011, now U.S. Pat. No. 8,764,256, and/or now abandoned U.S. Pat. No. 8,333,492, which are hereby incorporated herein by reference in their entireties. The cover provides an outer wall that substantially corresponds to the contours of the mirror assembly at the light module such that the mirror assembly has a substantially continuous outer surface or wall at the light module. The light module and housing or cover and/or mirror casing may be substantially sealed so as to be substantially impervious to water, dirt, debris and the like, so that the light module is well suited for the exterior application at the vehicle exterior rearview mirror assembly. The outer wall or walls of the cover may be substantially flush with the outer surface and contours of the mirror casing of the mirror assembly, and may be colored so as to substantially match or contrast the color of the mirror casing, depending on the particular application of the mirror assembly and light module.

The housing or cover panel of the light module may be at least partially or substantially translucent or transparent at least at the regions corresponding to or aligned with the light directing or reflecting portions 20a-d such that illumination emitted via the illumination sources is transmitted through the cover panel and toward the front area forward and sidewardly of the mirror assembly at the side of the vehicle. Optionally, the cover panel may provide a diffusing optic or diffusing effect or frosting to diffuse or spread out the emitted light to provide substantially uniform illumination and to limit or substantially preclude bright spots when the illumination sources are activated.

Optionally, and desirably, the cover panel may be overmolded over the illumination source or sources and circuitry to provide a substantially sealed and substantially water impervious illumination module. For example, a housing or cover panel may be overmolded over and around a metal stamping or stamped circuit element or plate with the illumination source or sources (such as LEDs or the like) fastened thereto or otherwise established thereon, or the housing may be overmolded over and around a printed circuit board or element with the illumination sources established thereon.

The light module may be located or established at or in the exterior surface or wall of the exterior mirror casing, such as in a metallic or plastic or polymeric portion of the mirror casing. The cover panel of the light module may have any desired or suitable exterior finish, such as a class A surface finish, and may be colored or finished to any desired or suitable finish, such as a black or dark or colored finish (or the material may be black or dark or colored polymeric or metallic material). Optionally, the cover panel may have a chrome finish or brushed aluminum finish or the like, such that illumination is provided through the chrome or brushed aluminum finished wall or structure of the mirror assembly.

Optionally, the illumination module and/or the exterior rearview mirror assembly may incorporate a blind spot indicator device or element and/or a turn signal indicator device or element, such as by utilizing aspects of the devices described in U.S. provisional applications, and/or U.S. Pat. Nos. 8,058,977; 7,944,371; 7,626,749; 7,492,281; 7,255,451; 6,198,409; 5,929,786 and 5,786,772, and/or U.S. patent application Ser. No. 12/187,725, filed Aug. 7, 2008, now U.S. Pat. No. 8,786,704, which are hereby incorporated herein by reference in their entireties. The signal indicator or indication module may include or utilize aspects of various light modules or systems or devices, such as the types described in U.S. Pat. Nos. 7,581,859; 7,289,037; 6,227,689; 6,582,109; 5,371,659; 5,497,306; 5,669,699; 5,823,654; 6,176,602 and/or 6,276,821, and/or U.S. patent application Ser. No. 11/226,628, filed Sep. 14, 2005 and published Mar. 23, 2006 as U.S. Publication No. US-2006-0061008, and/or PCT Application No. PCT/US2006/018567, filed May 16, 2006 and published Nov. 23, 2006 as International Publication No. WO 2006/124682, which are hereby incorporated herein by reference in their entireties. Optionally, the exterior rearview mirror assembly may include a wide angle reflector at or integral with the reflective element, such as by utilizing aspects of the elements described in U.S. Pat. Nos. 7,748,856; 7,255,451; 7,195,381; 6,717,712; 7,126,456; 6,315,419; 7,097,312 and/or 6,522,451, which are hereby incorporated herein by reference in their entireties.

Optionally, the illumination module may also comprise a ground illumination light or puddle lamp, which provides downwardly directed illumination (and which may provide a back lit icon or indicia or logo or the like), such as by utilizing aspects of the illumination systems described in U.S. Pat. Nos. 8,333,492; 5,371,659; 5,669,699; 5,823,654 and 5,497,305, and/or U.S. patent application Ser. No. 13/249,433, filed Sep. 30, 2011, now U.S. Pat. No. 8,764,256, which are hereby incorporated herein by reference in their entireties. Optionally, the illumination module may comprise a cornering light and a puddle lamp and turn signal light, and may have a wrap-around style turn signal at the exterior mirror that may be fitted with a prism lens or the like to project light in the appropriate direction and/or toward the targeted location. The illumination module thus may include one or more illumination sources and one or more lenses or optics or light pipes or the like to distribute or direct illumination toward the appropriate targeted areas.

Changes and modifications to the specifically described embodiments may be carried out without departing from the principles of the present invention, which is intended to be limited only by the scope of the appended claims as interpreted according to the principles of patent law.

The invention claimed is:

1. A vehicular lighted exterior rearview mirror system, said vehicular lighted exterior rearview mirror system comprising:

a lighted exterior rearview mirror assembly configured to attach at a side of a vehicle equipped with said vehicular lighted exterior rearview mirror system, wherein said lighted exterior rearview mirror assembly comprises a mirror casing and a reflective element;

a light module disposed at said lighted exterior rearview mirror assembly, wherein, with said lighted exterior rearview mirror assembly attached at the side of the equipped vehicle, said light module is at least in part disposed at a portion of said mirror casing of said lighted exterior rearview mirror assembly that faces forward in a direction of forward travel of the equipped vehicle;

wherein said light module comprises a plurality of illumination sources operable to emit light;

wherein said plurality of illumination sources comprises at least three forward illuminating illumination sources that, with said lighted exterior rearview mirror assembly attached at the side of the equipped vehicle, are arranged spaced apart at said lighted exterior rearview mirror assembly;

wherein, with said lighted exterior rearview mirror assembly attached at the side of the equipped vehicle, each of said at least three forward illuminating illumination sources, when powered, emits light at least in the direction of forward travel of the equipped vehicle;

wherein said forward illuminating illumination sources are controlled responsive to a user input operable by an occupant of the equipped vehicle;

wherein, responsive to activation by the occupant of the user input of the equipped vehicle, any one or more of said forward illuminating illumination sources is electrically powered;

wherein said at least three forward illuminating illumination sources are individually controlled responsive to an object detection system of the equipped vehicle so as to direct an illumination beam towards a detected object at or near the equipped vehicle;

wherein said plurality of illumination sources comprises a turn signal indicating illumination source; and wherein said light module comprises a light piping element having an inboard end and an outboard end, and wherein said turn signal indicating illumination source is disposed at the inboard end of said light piping element, and wherein said light piping element guides light emitted by said turn signal indicating illumination source along said light piping element so as to emanate from said light module at an outboard portion of said mirror casing.

2. The vehicular lighted exterior rearview mirror system of claim 1, wherein said light module comprises a light-transmitting cover, and wherein said at least three forward illuminating illumination sources are disposed behind said light-transmitting cover and operable to emit light that passes through said light-transmitting cover.

3. The vehicular lighted exterior rearview mirror system of claim 2, wherein said light piping element is part of said light-transmitting cover.

4. The vehicular lighted exterior rearview mirror system of claim 3, wherein light emitted by said at least three forward illuminating illumination sources passes through said light piping element in the direction of forward travel of the equipped vehicle and light emitted by said turn signal indicating illumination source is guided in a sideward direction relative to the equipped vehicle.

5. The vehicular lighted exterior rearview mirror system of claim 1, wherein said plurality of illumination sources comprises a plurality of light emitting diodes.

6. The vehicular lighted exterior rearview mirror system of claim 5, wherein a control is responsive to the user input of the equipped vehicle to selectively individually energize said at least three forward illuminating illumination sources.

7. The vehicular lighted exterior rearview mirror system of claim 6, wherein said control adjusts a duty cycle of each light emitting diode of said at least three forward illuminating illumination sources responsive to the user input of the equipped vehicle.

8. The vehicular lighted exterior rearview mirror system of claim 1, wherein, responsive to adjustment of the user input by the occupant of the equipped vehicle, an intensity of illumination forward of the equipped vehicle provided by said light module is adjusted.

9. The vehicular lighted exterior rearview mirror system of claim 1, wherein said plurality of illumination sources further comprises an icon backlighting illumination source, and wherein said mirror casing has an icon or indicia established thereat, and wherein light emitted by said icon backlighting illumination source backlights the icon or indicia.

10. The vehicular lighted exterior rearview mirror system of claim 1, wherein said mirror casing has an icon or indicia established thereat, and wherein light emitted by at least one illumination source of said plurality of illumination sources backlights the icon or indicia.

11. The vehicular lighted exterior rearview mirror system of claim 1, wherein said light piping element includes a plurality of indication elements that illuminate when said turn signal indicating illumination source is activated so as to be viewable to a person viewing said lighted exterior rearview mirror assembly from forward of the equipped vehicle.

12. The vehicular lighted exterior rearview mirror system of claim 1, wherein said light module comprises a heat dissipating structure established at said plurality of illumination sources to dissipate heat generated by said plurality of illumination sources when any of said plurality of illumination sources are operated.

13. The vehicular lighted exterior rearview mirror system of claim 1, wherein said at least three forward illuminating illumination sources comprises at least four spaced apart forward illuminating illumination sources.

14. The vehicular lighted exterior rearview mirror system of claim 1, wherein said at least three forward illuminating illumination sources are arranged horizontally spaced apart at said lighted exterior rearview mirror assembly when said lighted exterior rearview mirror assembly is attached at the side of the equipped vehicle.

15. A vehicular lighted exterior rearview mirror system, said vehicular lighted exterior rearview mirror system comprising:
a lighted exterior rearview mirror assembly configured to attach at a side of a vehicle equipped with said vehicular lighted exterior rearview mirror system, wherein said lighted exterior rearview mirror assembly comprises a mirror casing and a reflective element;
a light module disposed at said lighted exterior rearview mirror assembly, wherein, with said lighted exterior rearview mirror assembly attached at the side of the equipped vehicle, said light module is at least in part disposed at a portion of said mirror casing of said lighted exterior rearview mirror assembly that faces forward in a direction of forward travel of the equipped vehicle;
wherein said light module comprises a plurality of illumination sources operable to emit light;
wherein said plurality of illumination sources comprises at least three forward illuminating illumination sources that, with said lighted exterior rearview mirror assembly attached at the side of the equipped vehicle, are arranged horizontally spaced apart at said lighted exterior rearview mirror assembly;
wherein said light module comprises a light-transmitting cover, and wherein said at least three forward illuminating illumination sources are disposed behind said light-transmitting cover and operable to emit light that passes through said light-transmitting cover;
wherein, with said lighted exterior rearview mirror assembly attached at the side of the equipped vehicle, each of said at least three forward illuminating illumination sources, when powered, emits light at least in the direction of forward travel of the equipped vehicle;
wherein said forward illuminating illumination sources are controlled responsive to a user input operable by an occupant of the equipped vehicle;
wherein, responsive to activation by the occupant of the user input of the equipped vehicle, any one or more of said forward illuminating illumination sources is electrically powered;
wherein, responsive to adjustment of the user input by the occupant of the equipped vehicle, an intensity of illumination forward of the equipped vehicle provided by said light module is adjusted;
wherein said at least three forward illuminating illumination sources are individually controlled responsive to an object detection system of the equipped vehicle so as to direct an illumination beam towards a detected object at or near the equipped vehicle;
wherein said plurality of illumination sources comprises a turn signal indicating illumination source; and
wherein said light module comprises a light piping element having an inboard end and an outboard end, and wherein said turn signal indicating illumination source is disposed at the inboard end of said light piping element, and wherein said light piping element guides light emitted by said turn signal indicating illumination source along said light piping element so as to emanate from said light module at an outboard portion of said mirror casing.

16. The vehicular lighted exterior rearview mirror system of claim 15, wherein said light piping element is part of said light-transmitting cover.

17. The vehicular lighted exterior rearview mirror system of claim 16, wherein light emitted by said at least three forward illuminating illumination sources passes through said light piping element in the direction of forward travel of the equipped vehicle and light emitted by said turn signal indicating illumination source is guided in a sideward direction relative to the equipped vehicle.

18. The vehicular lighted exterior rearview mirror system of claim 17, wherein said light piping element includes a plurality of indication elements that illuminate when said turn signal indicating illumination source is activated so as to be viewable to a person viewing said lighted exterior rearview mirror assembly from forward of the equipped vehicle.

19. The vehicular lighted exterior rearview mirror system of claim 15, wherein said plurality of illumination sources comprises a plurality of light emitting diodes.

20. The vehicular lighted exterior rearview mirror system of claim 15, wherein said mirror casing has an icon or indicia established thereat, and wherein light emitted by at least one illumination source of said plurality of illumination sources backlights the icon or indicia.

21. A vehicular lighted exterior rearview mirror system, said vehicular lighted exterior rearview mirror system comprising:
  a lighted exterior rearview mirror assembly configured to attach at a side of a vehicle equipped with said vehicular lighted exterior rearview mirror system, wherein said lighted exterior rearview mirror assembly comprises a mirror casing and a reflective element;
  a light module disposed at said lighted exterior rearview mirror assembly, wherein, with said lighted exterior rearview mirror assembly attached at the side of the equipped vehicle, said light module is at least in part disposed at a portion of said mirror casing of said lighted exterior rearview mirror assembly that faces forward in a direction of forward travel of the equipped vehicle;
  wherein said light module comprises a plurality of light emitting diodes operable to emit light;
  wherein said plurality of light emitting diodes comprises at least three forward illuminating light emitting diodes that, with said lighted exterior rearview mirror assembly attached at the side of the equipped vehicle, are arranged spaced apart at said lighted exterior rearview mirror assembly;
  wherein said light module comprises a light-transmitting cover, and wherein said at least three forward illuminating light emitting diodes are disposed behind said light-transmitting cover and operable to emit light that passes through said light-transmitting cover;
  wherein, with said lighted exterior rearview mirror assembly attached at the side of the equipped vehicle, each of said at least three forward illuminating light emitting diodes, when powered, emits light at least in the direction of forward travel of the equipped vehicle;
  wherein said forward illuminating light emitting diodes are controlled responsive to a user input operable by an occupant of the equipped vehicle;
  wherein, responsive to activation by the occupant of the user input of the equipped vehicle, any one or more of said forward illuminating light emitting diodes is electrically powered;
  wherein said at least three forward illuminating illumination sources are individually controlled responsive to an object detection system of the equipped vehicle so as to direct an illumination beam towards a detected object at or near the equipped vehicle;
  wherein said plurality of light emitting diodes comprises a turn signal indicating light emitting diode; and
  wherein said light module comprises a light piping element having an inboard end and an outboard end, and wherein said turn signal indicating light emitting diode is disposed at the inboard end of said light piping element, and wherein said light piping element guides light emitted by said turn signal indicating light emitting diode along said light piping element so as to emanate from said light module at an outboard portion of said mirror casing.

22. The vehicular lighted exterior rearview mirror system of claim 21, wherein said light piping element is part of said light-transmitting cover.

23. The vehicular lighted exterior rearview mirror system of claim 22, wherein light emitted by said at least three forward illuminating light emitting diodes passes through said light piping element in the direction of forward travel of the equipped vehicle and light emitted by said turn signal indicating light emitting diode is guided in a sideward direction relative to the equipped vehicle.

24. The vehicular lighted exterior rearview mirror system of claim 21, wherein said mirror casing has an icon or indicia established thereat, and wherein light emitted by at least one light emitting diode of said plurality of light emitting diodes backlights the icon or indicia.

25. The vehicular lighted exterior rearview mirror system of claim 21, wherein said light piping element includes a plurality of indication elements that illuminate when said turn signal indicating light emitting diode is activated so as to be viewable to a person viewing said lighted exterior rearview mirror assembly from forward of the equipped vehicle.

* * * * *